United States Patent
Watanabe et al.

[11] Patent Number: 5,874,513
[45] Date of Patent: *Feb. 23, 1999

[54] ETHYLENE-α-OLEFIN COPOLYMER AND COMPOSITION, AND FILM, LAMINATE AND ELECTRICAL INSULATING MATERIAL COMPRISING SAME

[75] Inventors: Hideo Watanabe, Tokyo; Masahiko Sato, Kanagawa; Masaaki Ikeda, Tokyo; Takaaki Hattori, Kanagawa; Yoshihiro Hatakeyama, Kanagawa; Naoki Miwa, Kanagawa; Tatsuyuki Kamiya, Kanagawa; Hisao Sakuma, Kanagawa; Yuka Umeshima, Tokyo, all of Japan

[73] Assignee: Nippon Petrochemicals Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 623,181

[22] Filed: Mar. 28, 1996

[30] Foreign Application Priority Data

| Mar. 28, 1995 | [JP] | Japan | 7-106797 |
| May 12, 1995 | [JP] | Japan | 7-147984 |
| Jun. 30, 1995 | [JP] | Japan | 7-197851 |
| Aug. 25, 1995 | [JP] | Japan | 7-216999 |
| Sep. 29, 1995 | [JP] | Japan | 7-287758 |

[51] Int. Cl.$^6$ ............ C08F 10/02; C08F 210/02
[52] U.S. Cl. ............ 526/348.1; 526/153; 526/160; 526/348.4; 526/348.6; 526/943
[58] Field of Search ............ 526/133, 153, 526/160, 348.1, 348.4, 348.6, 943

[56] References Cited

U.S. PATENT DOCUMENTS

| 4,505,969 | 3/1985 | Weiner | 428/213 |
| 5,218,071 | 6/1993 | Tsutsui et al. | 526/348 |
| 5,331,071 | 7/1994 | Kataoka et al. | 526/128 |
| 5,391,660 | 2/1995 | Numao et al. | 526/128 |
| 5,459,217 | 10/1995 | Todo et al. | 526/348.1 |

FOREIGN PATENT DOCUMENTS

| 520816 | 12/1992 | European Pat. Off. |
| A-0572034 | 12/1993 | European Pat. Off. |
| A-0594218 | 4/1994 | European Pat. Off. |
| A-0598628 | 5/1994 | European Pat. Off. |
| A-0640627 | 3/1995 | European Pat. Off. |

OTHER PUBLICATIONS

Patent Abstracts of Japan, vol. 018, No. 029 (E–1492), 17 Jan. 1994 for JP–A–5–266723 (Sumitomo Electric Ind Ltd) 15 Oct. 1993.

*Primary Examiner*—David W. Wu
*Attorney, Agent, or Firm*—Sughrue, Mion, Zinn, Macpeak & Seas, PLLC

[57] ABSTRACT

An ethylene-α-olefin copolymer having: (A) a density d of 0.86 to 0.96 g/cm$^3$; (B) a melt flow rate MFR of 0.01 to 200 g/10 min; (C) a molecular weight distribution Mw/Mn of 1.5 to 4.5; (D) a composition distribution parameter Cb of 1.08 to 2.00; and (E) an orthodichlorobenzene-soluble content X (wt %), at 25° C. a density of d (g/cm$^3$) and a melt flow rate MFR (g/10 min) satisfying that: (i) when the density (d) and the melt flow rate MFR satisfy relationship (I):

$$d - 0.008 \times \log MFR \geq 0.93 \quad (I)$$

the orthodichlorobenzene-soluble content X satisfies relationship (II):

$$X < 2.0 \quad (II)$$

(ii) when the density d and the melt flow rate MFR satisfy relationship (III):

$$d - 0.008 \times \log MFR < 0.93 \quad (III)$$

the orthodichlorobenzene-soluble content X satisfies relationship (IV):

$$X < 9.8 \times 10^3 \times (0.9300 - d + 0.008 \times \log MFR)^2 + 2.0 \quad (IV)$$

11 Claims, 3 Drawing Sheets

ETHYLENE-α-OLEFIN COPOLYMER AND COMPOSITION, AND FILM, LAMINATE AND ELECTRICAL INSULATING MATERIAL COMPRISING SAME

FIELD OF THE INVENTION

The present invention relates to a novel ethylene-α-olefin copolymer having excellent physical properties and workability. Particularly, the present invention provides an ethylene-α-olefin copolymer, which has a relatively broad composition distribution despite its narrow molecular weight distribution, and a low content of low molecular components and amorphous components; exhibits excellent mechanical properties, moldability,,optical properties, and heat resistance; and is suitable for production of films produced by extrusion molding (such as wrapping films and raw films for laminates), vessels produced by blow molding, vessels, lids and containers produced by injection molding, sheaths for wires, cables and steel plates, and electrical insulating materials. The present invention also provides a resin composition comprising the foregoing ethylene-α-olefin copolymer and other polyolefin resins, which is suitable for the foregoing extrusion molding, blow molding and injection molding.

More particularly, the present invention provides films suitable for wrapping films produced by T-die molding or inflation molding of the foregoing ethylene-α-olefin copolymer or a resin composition comprising the same, and laminates comprising the film. The present invention further provides an insulating material comprising the foregoing ethylene-α-olefin copolymer or the resin composition, and a power cable comprising a conductor having thereon an insulating layer comprising the foregoing ethylene-α-olefin copolymer or a resin composition comprising the same, which may be crosslinked or non-crosslinked.

BACKGROUND OF THE INVENTION

Linear low density polyethylene polymers (LLDPE) polymerized by using conventional Ziegler catalysts are used as various articles, such as films, sheets, blow-molded articles, injection-molded articles and the like, because of their excellent moldability, transparency, strength and heat-seal strength. In the field of films and sheets, they are widely used as various wrapping materials (as disclosed in JP-A-52-135386 and JP-A-61-284439). (The term "JP-A" used herein means an "unexamined published Japanese patent application".) Recently, however, higher transparency and film strength have been demanded. Further, films adapted to be processed by an automatic bag making machine have needed to be processed at a higher speed. Thus, films having excellent low temperature heat-seal properties have been demanded.

When a film is heat-sealed at a high speed, it must be processed in a short period of time that tends to cause the film to be fused insufficiently. The resulting product is liable to shortage of strength. In order to eliminate this difficulty, a method may be employed which comprises the rise in the temperature of the heat seal bar. However, this method is disadvantageous in that the laminated film is curled. Another method is to lower the resin density and hence to lower the melting point of the resin. However, conventional linear low density polyethylene (LLDPE) is disadvantageous in that when the density thereof are lowered, it raises the content of highly branched low molecular components which are partly eluted on the surface thereof, rendering the film sticky and less peelable. The eluate also can migrate into the content of the bag.

Further, LLDPE films have wider application. For example, LLDPE films can be laminated with a resin having excellent gas barrier properties such as polyamide, polyester and saponification product of ethylene-vinyl acetate or a resin having a high rigidity such as high density polyethylene and polypropylene, to form a laminate having good heat-seal properties as well as high gas barrier properties or high nerve, which can be used as a bag-forming material adapted for high speed processing, such as a food wrapping material and bag, a food container and a medicine container.

The LLDPE films have been widely used as heat-sealing films (sealant film) for these laminates. These laminates may be laminated on a base material (base film) by extrusion lamination process, dry lamination process, sand lamination process, co-extrusion T-die process, co-extrusion blown film process or the like. Among these lamination processes, the dry lamination process is conducted with a polyether adhesive, a polyurethane adhesive, a vinyl acetate adhesive, an isocyanate adhesive, a polyethyleneimine adhesive or the like. Some of these adhesives are subjected to heat treatment after lamination to undergo curing. During this heat treatment process, the lubricant incorporated in the film can migrate to the adhesive layer, problems arise as rendering the surface of the laminate less peelable and less lubricating and hence causing troubles in the bag making process and filling process.

In recent years, in order to meet the above requirements and remove the disadvantages, a high strength ethylene-α-olefin copolymer having a very narrow molecular weight distribution and a very narrow composition distribution has been developed by employing a preparation process in the presence of a metalocene catalyst. However, such an ethylene-α-olefin copolymer has some disadvantages. Such an ethylene-α-olefin copolymer has a very narrow composition distribution and thus shows a very sudden change of viscosity and modulus with temperature. Thus, the applicable temperature and extrusion conditions under which such an ethylene-α-olefin copolymer is molded is restricted making it difficult to mold such an ethylene-α-olefin copolymer. Further, such an ethylene-α-olefin copolymer is disadvantageous in that it gives a molded product which can exhibit a sufficient heat resistance, a proper heat-seal strength or a good hot tack strength only in a narrow temperature range. For example, when applied to the field of film, sheet or the like, such an ethylene-α-olefin copolymer can be easily heat-sealed. Accordingly, such an ethylene-α-olefin copolymer is often heat-sealed and used in the form of bag. In this application, sufficient hot tack properties are required. In other words, when such a bag is filled with a content, the seal area which has been heat-sealed is immediately pulled under load and may be peeled. In this application, a heat-sealable ethylene-α-olefin copolymer which can be heat-sealed in a wide temperature range to show a high resistance to peeling shortly after sealing is desirable.

As means for improving moldability of such an ethylene-α-olefin copolymer having a very narrow composition distribution, an attempt has been made to improve the melt properties of the resin while keeping the composition distribution narrow by using a metalocene catalyst having a plurality of ligands (as disclosed in JP-A-6-206939). However, this method is disadvantageous in that it gives a wider molecular weight distribution or produces long-chain branches, causing decrease in strength. Further, an attempt has been made to improve the moldability by using a mixed catalyst system of Ziegler catalysts (as disclosed in JP-A-6-157631). However, this method gives a wider molecular weight distribution that impairs the strength.

In the field of electrical insulating materials for high voltage power cable, there have heretofore been widely used a high pressure process low density polyethylene, crosslinked polyethylene, etc. because they have excellent electrical properties.

One of difficulties with high voltage power cable is power loss developed during power transmission. The reduction of power loss is an important demand to be met.

The reduction of power loss can be accomplished by enhancing the high voltage properties, particularly volume resistance, of the insulating material. However, the insulating material for power cable is heated to high temperatures (about 90° C.) by Joule heat generated by the passage of current in the vicinity of the inner conductor but is kept at the ambient temperature (about 20° C.) in the vicinity of the outer conductor. The conventional polyethylene shows a marked volume resistance drop with the rise in temperature. Accordingly, the polyethylene shows a marked volume resistance drop in the vicinity of the inner conductor through which current flows. Thus, an electric field is concentrated in the vicinity of the interface of the outer conductor with the insulating material, lowering the breakdown strength of the insulating material. This phenomenon presents a great problem particularly with direct current power cables. Therefore, insulating materials having a small temperature dependence of volume resistance have been desired.

When a high pressure process low density polyethylene is used as an insulating material for high voltage cable, its low melting point gives poor electrical properties. On the other hand, the conventional low pressure process polyethylene, which exhibits a high melting point, does not necessarily have excellent electrical properties, probably due to the effect of catalyst residue. The conventional low pressure process polyethylene is also disadvantageous in that it exhibits a poor flexibility.

In order to improve the electrical properties of the low pressure process polyethylene, a method has been proposed which comprises grafting maleic anhydride onto the polyethylene (as disclosed in JP-A-2-10610). However, this method cannot necessarily give full solution to the foregoing problems, including flexibility.

As a high volume resistance material having excellent heat resistance and flexibility there have been disclosed an insulating material obtained by blending 100 parts by weight of a high pressure process low density polyethylene having a density of 0.92 g/cm$^3$ with from 0.5 to 20 parts by weight of a linear low density polyethylene having a density of from 0.91 to 0.94 g/cm$^3$ (as described in JP-A-5-26723). However, the foregoing composition leaves something to be desired because it has a great temperature dependence of volume resistance in the vicinity of the inner conductor.

SUMMARY OF THE INVENTION

An object of the present invention to provide an ethylene-α-olefin copolymer excellent in various properties such as mechanical strength, moldability, thermal stability, chemical stability, electrical properties, transparency, flexibility, and impact resistance.

The ethylene-α-olefin copolymer of the present invention exhibits, when used as a film, excellent transparency, impact strength, hot tack property, heat seal property, and anti-blocking property. By laminating the film comprising the ethylene-α-olefin copolymer of the present invention with a resin film having gas-barrier property or heat resistance, a laminate suitable for wrapping films and containers, which is excellent in heat seal property and can be scarcely eluted with the content of the container.

Another object of the present invention is to provide an electrical insulating material which exhibits a high volume resistance and a small temperature dependence of volume resistance.

These and other objects of the present invention will become more apparent from the following detailed description and examples.

The present invention relates to, as a first aspect, an ethylene-α-olefin copolymer having:

(A) a density d of 0.86 to 0.96 g/cm$^3$;

(B) a melt flow rate MFR of 0.01 to 200 g/10 min;

(C) a molecular weight distribution Mw/Mn of 1.5 to 4.5;

(D) a composition distribution parameter Cb of 1.08 to 2.00; and (E) an orthodichlorobenzene-soluble content X (wt %), at 25° C. a density d (g/cm$^3$) and a melt flow rate MFR (g/10 min) satisfying that:

(i) when the density d and the melt flow rate MFR satisfy relationship (I):

$$d-0.008\times\log MFR \geq 0.93 \tag{I}$$

the orthodichlorobenzene-soluble content X satisfies relationship (II):

$$X<2.0 \tag{II}$$

(ii) when the density d and the melt flow rate MFR satisfy relationship (III):

$$d-0.008\times\log MFR<0.93 \tag{III}$$

the orthodichlorobenzene-soluble content X satisfies relationship (IV):

$$X<9.8\times10^3\times(0.9300-d+0.008\times\log MFR)^2+2.0 \tag{IV}$$

In the ethylene-α-olefin copolymer of the first aspect, the molecular weight distribution Mw/Mn is preferably from 1.8 to 3.5, and further preferably the composition distribution parameter Cb is from 1.10 to 2.00.

In the ethylene-α-olefin copolymer of the first aspect, it is also preferred that the copolymer has (F) a number of peaks on an elution temperature-eluted amount curve determined by continuous temperature rising elution fractionation method TREF is 2 or more, and/or (G) an electrical activation energy of not more than 0.4 eV.

The present invention also relates to, as a second aspect, a polyolefin resin composition comprising not less than 2% by weight of the ethylene-α-olefin copolymer according to the first aspect and not more than 98% by weight of a polyolefin.

The present invention also relates to, as a third aspect, a film comprising the ethylene-α-olefin copolymer according to the first aspect or the resin composition according to the second aspect.

The present invention also relates to, as a fourth aspect, a laminated material comprising the film according to the third aspect. The laminated material of the present invention preferably comprises a layer comprising the ethylene-α-olefin copolymer of the first aspect or the resin composition of the second aspect, and a gas barrier material layer.

The present invention also relates to, as a fifth aspect, an electrical insulating material comprising the ethylene-α- olefin copolymer according to the first aspect or the resin composition according to the second aspect.

The present invention also relates to, as a sixth aspect, a power cable comprising a conductor having thereon an electrical insulating layer comprising the insulating material according to the fifth aspect.

BRIEF DESCRIPTION OF THE DRAWINGS

By way of example and to make the description more clear, reference is made to the accompanying drawings in which.

DETAILED DESCRIPTION OF THE INVENTION

Figure 1:
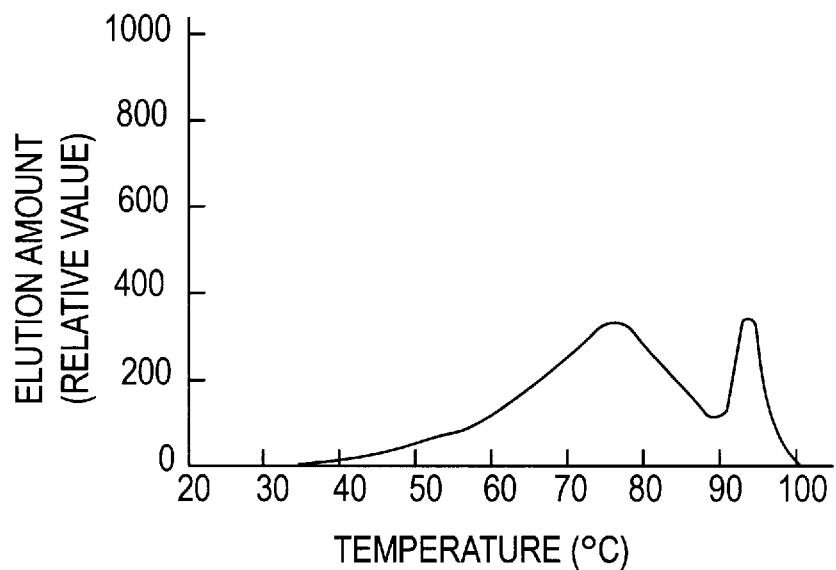
FIG. 1 is an elution temperature-eluted amount curve determined by TREF of a copolymer according to a particularly preferred embodiment of the present invention.

The ethylene-α-olefin copolymer according to the first aspect of the present invention will be further described hereinafter.

The ethylene-α-olefin copolymer according to the present invention is a copolymer of ethylene with one or more selected from $C_{3-20}$ α-olefins. (The expression "$C_{m-n}$" used herein means "having from m to n carbon atoms".) The $C_{3-20}$ α-olefin preferably has from 3 to 12 carbon atoms. Specific examples of such a $C_{3-20}$ α-olefin include propylene, 1-butene, 1-pentene, 4-methyl-1-pentene, 1-hexene, 1-octene, 1-decene, and 1-dodecene. The total content of such an α-olefin in the copolymer is generally not more than 30 mol%, preferably from 3 to 20 mol %.

The density of the ethylene-α-olefin copolymer according to the present invention (A) is from 0.86 to 0.96 g/cm³, preferably from 0.88 to 0.95 g/cm³, more preferably from 0.90 to 0.930 g/cm³. If the density of the ethylene-α-olefin copolymer falls below 0.86 g/cm³, the ethyleneα-olefin copolymer exhibits a reduced rigidity and heat resistance. If the density of the ethylene-α-olefin copolymer exceeds 0.96 g/cm³, the ethylene-α-olefin copolymer exhibits an insufficient impact resistance.

The MFR of the ethylene-α-olefin copolymer according to the present invention (B) is from 0.01 to 200 g/10 min, preferably from 0.1 to 100 g/10 min, more preferably from 0.2 to 50 g/10 min. If the MFR of the ethylene-α-olefin copolymer falls below 0.01 g/10 min, the ethylene-α-olefin copolymer exhibits a reduced moldability. If the MFR of the ethyleneα-olefin copolymer exceeds 200 g/10 min, the ethylene-α-olefin copolymer exhibits decrease in mechanical strength such as impact resistance.

For the calculation of the molecular weight distribution Mw/Mn of the ethylene-α-olefin copolymer according to the present invention (C), the weight-average molecular weight (Mw) and number-average molecular weight (Mn) of the ethylene-α-olefin copolymer are determined by gel permeation chromatography (GPC). The ratio Mw/Mn is then determined.

The Mw/Mn of the ethylene-α-olefin copolymer according to the present invention is from 1.5 to 4.5, preferably from 1.8 to 3.5, more preferably from 2.0 to 3.0, particularly from 2.2 to 2.8. If Mw/Mn falls below 1.5, the ethylene-α-olefin copolymer exhibits a reduced moldability. If the Mw/Mn exceeds 4.5, the ethylene-α-olefin copolymer exhibits a reduced impact resistance.

The composition distribution parameter Cb of the ethylene-α-olefin copolymer according to the present invention (D) is from 1.08 to 2.00, preferably from 1.10 to 2.00, more preferably from 1.12 to 1.70, particularly from 1.15 to 1.50. If the composition distribution parameter Cb of the ethylene-α-olefin copolymer falls below 1.08, the ethylene-α-olefin copolymer exhibits deteriorated hot tack properties. If the composition distribution parameter Cb of the ethylene-α-olefin copolymer exceeds 2.00, the ethylene-α-olefin copolymer exhibits a reduced transparency, and further the resulting molded product comprises a high molecular gel developed therein.

The composition distribution parameter Cb of the ethylene-α-olefin copolymer according to the present invention can be measured by the following method.

The sample is dissolved in orthodichlorobenzene (ODCB) with a heat-resisting stabilizer at a temperature of 135° C. in such a manner that the sample concentration reaches 0.2% by weight. The solution thus heated is then transferred to a column filled with a diatomaceous earth (Celite 545). After fully impregnated with the solution, the column is cooled to 25° C. at a rate of 0.1° C./min so that the sample is deposited on the surface of Celite. The temperature of the column is then stepwise raised to 120° C. at intervals of 5° C. while ODCB is being passed therethrough at a constant rate. At the various temperatures, solutions of the samples are collected. After cooled, these solutions are each subjected to reprecipitation with methanol, filtered off, and then dried to obtain the sample at the various temperatures. The samples thus fractionated are then measured for weight fraction and degree of short chain branching (number of branches per 1,000 carbon atoms). The measurement of degree of branching is determined by $^{13}$C-NMR.

For the various fractions thus sampled at temperatures of-from 30° C. to 90° C., the following correction is made for degree of branching. The degrees of branching thus measured are then plotted against the elution temperature. The correlation between the degree of branching and the elution temperature is then linearly approximated by the least squares method to make a calibration curve. The coefficient of correlation of this approximation is sufficiently great. The value obtained from the calibration curve indicates the degree of branching of the fraction. The fractions obtained at an elution temperature of not lower than 95° C. do not necessarily have a linear relationship between the elution temperature and the degree of branching and thus are not corrected for degree of branching.

The weight fraction wi of the various fractions are each divided by the change of the degree of branching $(b_i-b_{i-1})$ per 5° C. elution temperature to determine a relative amount $c_1$ (where $b_0=2b_1-b_2$). The relative amounts are then plotted against the degree of branching to obtain a composition distribution curve. The composition distribution curve is then divided into predetermined widths. The composition distribution parameter Cb is calculated from the following equation:

$$Cb = \frac{\Sigma c_j b_j^2}{\Sigma c_j b_j} \times \frac{\Sigma c_j}{\Sigma c_j b_j}$$

wherein $c_j$ and $b_j$ indicate the relative concentration and the degree of branching of the j-th section, respectively. The composition distribution parameter Cb is 1.0 if the composition of the sample is uniform. As the composition distribution becomes wider, this parameter becomes greater.

In the ethylene-α-olefin copolymer according to the present invention, ODCB-soluble content X at 25° C. (E) indicates the ratio of highly-branched components and low molecular components incorporated in the ethylene-α-olefin copolymer and is preferably small because it causes decrease in heat resistance and causes the surface of the molded product sticky. The amount of ODCB-soluble content is influenced by the total α-olefin content in the copolymer and the average molecular weight of the copolymer, i.e., density and MFR.

Accordingly, (i) when the density d and the melt flow rate MFR satisfy relationship (I):

$$d - 0.008 \times \log MFR \geq 0.93 \qquad (I)$$

the ODCB-soluble content X (% by weight) satisfies relationship (II), preferably relationship (II'), more preferably relationship (II"):

$$X < 2.0 \qquad (II)$$

$$X < 1.0 \qquad (II')$$

$$X < 0.5 \qquad (II'')$$

Further, (ii) when the density d and the melt flow rate XFR satisfy relationship (III):

$$d - 0.008 \times \log MFR < 0.93 \qquad (III)$$

the ODCB-soluble content X (% by weight) satisfies relationship (IV), preferably relationship (IV'), more preferably relationship (IV"):

$$X < 9.8 \times 10^3 \times (0.9300 - d + 0.008 \times \log MFR)^2 + 2.0 \qquad (IV)$$

$$X < 7.4 \times 10^3 \times (0.9300 - d + 0.008 \times \log MFR)^2 + 1.0 \qquad (IV')$$

$$X < 5.6 \times 10^3 \times (0.9300 - d + 0.008 \times \log MFR)^2 + 0.5 \qquad (IV'')$$

When the density, MFR and ODCB-soluble content satisfy the foregoing relationships, it indicates that α-olefin copolymerized in the entire copolymer is not maldistributed.

ODCB-soluble content X at 25° C. is measured by the following method.

0.5 g of the sample is added to 20 ml of ODCB. The mixture is then heated to a temperature of 135° C. for 2 hours so that the sample is thoroughly dissolved in ODCB. The solution is then allowed to cool to a temperature of 25° C. The solution is then allowed to stand at the same temperature overnight. The solution is then filtered through a teflon filter to obtain a filtrate as a sample solution. The solution is then measured for absorption peak intensity in the vicinity of 2,925 $cm^{-1}$, which is the wavenumber of the asymmetric stretching vibration of methylene, by means of an infrared spectrometer. The specimen concentration in the filtrate is then calculated from a calibration curve previously prepared. ODCB-soluble content at 25° C. is then determined from this value.

Figure 2:
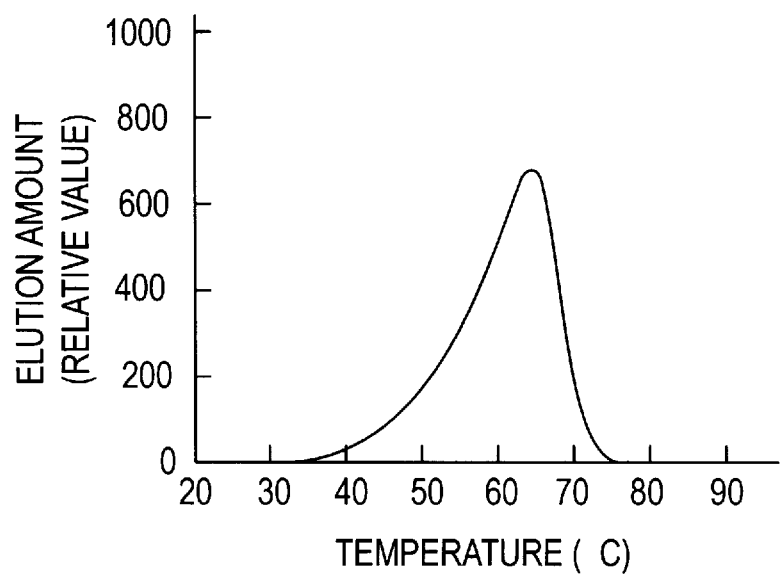
FIG. 2 is an elution temperature-eluted amount curve determined by TREF of a copolymer having a very narrow composition distribution.

The ethylene-α-olefin copolymer according to the present invention preferably has a plurality of peaks on the elution temperature-eluted amount curve determined by the continuous temperature rising elution fractionation method (TREF) (F). In particular, the peak on the high temperature side preferably lies between 85° C. and 100° C. The existence of this peak gives a higher melting point and an increased crystallinity. The resulting molded product has an enhanced heat resistance and rigidity. FIG. 1 illustrates the elution temperature-eluted amount curve of a copolymer according to a particularly preferred embodiment of the present invention. FIG. 2 illustrates the elution temperature-eluted amount curve of a copolymer having a very narrow composition distribution.

The copolymer shown in FIG. 2 has a very narrow composition distribution and thus shows a very sudden change of viscosity and modulus with temperature. Thus, the applicable temperature and extrusion conditions under which such an ethylene-α-olefin copolymer is molded is restricted, making it difficult to mold such an ethylene-α-olefin copolymer. Further, such an ethylene-α-olefin copolymer is disadvantageous in that it gives a molded product which has an insufficient heat resistance, and can exhibit a proper heat-seal strength or a good hot tack strength only in a narrow temperature range.

TREF is conducted in the following manner. A heat-resisting stabilizer is added to the sample. The mixture is then dissolved in ODCB at a temperature of 135° C. to obtain a sample concentration of 0.05% by weight. 5 ml of the solution thus heated is then poured into a column filled with glass beads. The column is then cooled to a temperature of 25° C. at a rate of 0.1° C./min so that the sample is deposited on the surface of the glass beads. The column is then heated at a constant rate of 50° C./hr while ODCB is being passed therethrough. At the various temperatures, the sample soluble in the solvent is sequentially eluted with ODCB. During this procedure, the concentration of the specimen in the solution is continuously detected by measuring the absorption with respect to 2,925 $cm^{-1}$, which is the wavenumber of the asymmetric stretching vibration of methylene by means of an infrared spectrometer. From these concentration values, an elution temperature-eluted amount curve can be obtained.

TREF analysis allows the continuous analysis of the change of elution rate with temperature from an extremely small amount of a sample. Thus, the detection of relatively fine peaks that cannot be detected by the fractionation method can be made.

As another preferred characteristics of the ethylene-α-olefin copolymer according to the present invention, it preferably exhibits an electrical activation energy of not more than 0.4 eV (G), preferably not more than 0.3 eV, more preferably not more than 0.25 eV. If the electrical activation energy of the ethylene-α-olefin copolymer exceeds 0.4 eV, the quantity and mobility of charged carriers such as ion and electron show a great increase that tends to deteriorate the thermal and chemical stability with the rise of temperature.

The above electrical activation energy is very small as compared with that of the conventional polyethylene materials. It is thus considered that the ethylene-α-olefin copolymer according to the present invention has a special structure such that the quantity and mobility of charged carriers contained therein are insusceptible to the effect of temperature.

The activation energy is one of constants included in Arrhenius' equation, which represents the change of rate constant with temperature in the process of transport phenomenon. It corresponds to the difference in energy between transition state and original system in the process toward the produced system from the original system via the transition state. In particular, the electrical activation energy is used in Arrhenius' equation representing the temperature dependence of current. The smaller the activation energy is, the smaller is the temperature dependence of current.

The electrical activation energy according to the present invention can be determined from the following equation (Arrhenius' equation):

$$I \propto \exp(-U/kT)$$

wherein I is current; U is activation energy; k is Boltzmann's constant; and T is absolute temperature.

Substituting the current value at room temperature (20° C.) and at 90° C. for I in the foregoing equation yields the electrical activation energy according to the present invention.

The ethylene-α-olefin copolymer according to the present invention has an electrical activation energy of not more than 0.4 eV as defined above to exhibit remarkably excellent electrical properties. For example, the ethylene-α-olefin copolymer according to the present invention can exhibit a volume resistivity of not lower than $10^{16}$ Ωcm, preferably not lower than $10^{17}$ Ωcm, more preferably not less than $10^{18}$ Ωcm, at 20° C. The fact that the ethylene-α-olefin copolymer according to the present invention has a high volume resistivity and a small activation energy shows that the ethylene-α-olefin copolymer has a structure such that the content or mobility of charged carriers such as ion and electron is small.

The ethylene-α-olefin copolymer of the present invention is preferably a copolymer obtained by polymerizing an olefin in the presence of a catalyst (H) produced by allowing the following components (1) to (4) to come into mutual contact with each other:

(1) a compound represented by $Me^1R^1_pR^2_q(OR^3)_rX^1_{4-p-q-r}$ where $R^1$ and $R^3$ each independently represent a $C_{1-24}$ hydrocarbon group or trialkylsilyl group; $R^2$ represents a 2,4-pentanedionate ligand, a dibenzoylmethanate ligand, a benzoylacetonate ligand, or derivative thereof; $X^1$ represents a halogen atom; $Me^1$ represents Zr, Ti or Hf; and p, q and r each represents an integer satisfying the relationships $0 \leq p \leq 4$, $0 \leq q \leq 4$, $0 \leq r \leq 4$, and $0 \leq (p+q+r) \leq 4$;

(2) a compound represented by $Me^2R^4_m(OR^5)_nX^2_{z-m-n}$ where $Me^2$ represents Group I, II, or III element; $R^4$ and $R^5$ each independently represent a $C_{1-24}$ hydrocarbon group; $X^2$ represents a hydrogen atom or a halogen atom, provided that when $X^2$ represents a hydrogen atom, $Me^2$ represents a Group III element; z represents the valence of $Me^2$; and m and n each represents an integer satisfying the relationships $0 \leq m \leq z$, $0 \leq n \leq z$, and $0 \leq (m+n) \leq z$;

(3) an organic cyclic compound having two or more conjugated double bonds; and (4) at least one of a modified organic aluminum oxy compound and a boron compound each having an Al—O—Al bond.

$Me^1$ in the compound represented by the general formula $Me^1R^1_pR^2_q(OR^3)_rX^1_{4-p-q-r}$ as the foregoing catalyst component (1) indicates Zr, Ti or Hf. The kind of such a transition metal is not limited. A plurality of such transition metals may be used in combination. It is particularly preferred that Zr, which renders the copolymer well weather-resistant, be included. $R^1$ and $R^3$ each represent a $C_{1-24}$, preferably $C_{1-12}$, more preferably $C_{1-8}$ hydrocarbon group. Specific examples of such a hydrocarbon group include an alkyl group such as methyl, ethyl, propyl, isopropyl and butyl, an alkenyl group such as vinyl and allyl, an aryl group such as phenyl, tollyl, xylyl, mesityl, indenyl and naphthyl, and an aralkyl group such as benzyl, trityl, phenethyl, styryl, benzhydryl, phenylbutyl and neophyl. These hydrocarbon groups may be branched. $R^2$ represents 2,4-pentanedionate ligand, dibenzoylmethanate ligand, benzoylacetanate ligand, or derivatives thereof. $X^1$ indicates a halogen atom such as fluorine, iodine, chlorine and bromine. The suffixes p, q and r satisfy the relationships $0 \leq p \leq 4$, $0 \leq q \leq 4$, $0 \leq r \leq 4$, and $0 \leq (p+q+r) \leq 4$.

Examples of the compound represented by the general formula as catalyst component (1) include tetramethyl zirconium, tetraethyl zirconium, tetrabenzyl zirconium, tetrapropoxy zirconium, tripropoxy monochlorozirconium, dipropoxy dichlorozirconium, tetrabutoxy zirconium, tributoxy monochlorozirconium, dibutoxy dichlorozirconium, tetrabutoxy titanium, and tetrabutoxy hafnium. Examples of the compound containing 2,4-pentadionate ligand include zirconium tetra(2,4-pentadionate), zirconium tri(2,4-pentadionate)chloride, zirconium di(2,4-pentadionate) dichloride, zirconium (2,4-pentadionate)trichloride, zirconium di(2,4-pentadionate)diethoxide, zirconium di(2,4-pentadionate)di-n-propoxide, zirconium di(2,4-pentadionate)di-n-butoxide, zirconium di(2,4-pentadionate) dibenzyl, and zirconium di(2,4-pentadionate)dineophyl. Examples of the compound containing dibenoylmethanate ligand include zirconium tetra(dibenzoylmethanate), zirconium di(dibenzoylmethanate)diethoxide, zirconium di(dibenzoylmethanate)di-n-propoxide, and zirconium di(dibenzoylmethanate)di-n-butoxide. Examples of the compound containing benzoylacetonate ligand include zirconium tetra(benzoylacetonate), zirconium di(benzoylacetonate)diethoxide, zirconium di(benzoylacetonate)di-n-propoxide, and zirconium di(benzoylacetonate)di-n-butoxide. These compounds may be used in admixture.

$Me^2$ in the compound represented by the general formula $Me^2R^4_m(OR^5)_nX^2_{z-m-n}$ as the foregoing catalyst component (2) indicates an element belonging to Groups I, II, and III such as lithium, sodium, potassium, magnesium, calcium, zinc, boron and aluminum. $R^4$ and $R^5$ each represent a $C_{1-24}$, preferably $C_{1-12}$, more preferably $C_{1-8}$ hydrocarbon group. Specific examples of such a hydrocarbon group include an alkyl group such as methyl, ethyl, propyl, isopropyl and butyl, an alkenyl group such as vinyl and allyl, an aryl group such as phenyl, tollyl, xylyl, mesityl, indenyl and naphthyl, and an aralkyl group such as benzyl, trityl, phenethyl, styryl, benzhydryl, phenylbutyl and neophyl. These hydrocarbon groups may be branched. $X^2$ indicates a hydrogen atom or a halogen atom such as fluorine, iodine, chlorine and bromine, provided that if $X^2$ is a hydrogen atom, $Me^2$ is limited to an element belonging to Group III such as boron and aluminum. The suffix z indicates the valence of $Me^2$. The suffixes m and n each represent an integer satisfying the relationships $0 \leq m \leq z$ and $0 \leq n \leq z$, and $0 \leq (m+n) \leq z$.

Examples of the compound represented by the general formula as catalyst component (2) include organic lithium compounds such as methyl lithium and ethyl lithium, organic magnesium compounds such as dimethyl magnesium, diethyl magnesium, methyl magnesium chloride and ethyl magnesium chloride, organic zinc compounds such as dimethyl zinc and diethyl zinc, organic boron compounds such as trimethyl boron and triethyl boron, and organic aluminum compounds such as trimethyl aluminum, triethyl aluminum, triisobutyl aluminum, trihexyl aluminum, tridecyl aluminum, diethyl aluminum chloride, ethyl aluminum dichloride, ethyl aluminum sesquichloride, diethyl aluminum ethoxide and diethyl aluminum hydride.

Examples of the organic cyclic compound having two or more conjugated double bonds as catalyst component (3) include a $C_{4-24}$, preferably $C_{4-12}$ cyclic hydrocarbon compound having one or more cycles having two or more, preferably two to four, more preferably two or three cyclic conjugated double bonds; a cyclic hydrocarbon compound having the foregoing cyclic hydrocarbon compound partially substituted by 1 to 6 hydrocarbon residues (typically, $C_{1-12}$ alkyl or aralkyl group), organic silicon compound having $C_{4-24}$, preferably $C_{4-12}$ cyclic hydrocarbon group having one or more cycles containing two or more, preferably two to four, more preferably two or three conjugated double bonds; and an organic silicon compound having the foregoing cyclic hydrocarbon group partially substituted by 1 to 6 hydrocarbon residues or alkaline metal salts (sodium or lithium salt). In particular, organic cyclic compounds having a cyclopentadiene structure anywhere in its molecule are preferred.

Preferred examples of the foregoing compound include cyclopentadiene, indene, azulene, and alkyl, aryl, aralkyl, alkoxy, aryloxy, and derivatives thereof. Further, compounds obtained by bonding (crosslinking) these compounds via an alkylene group (having 2 to 8, preferably 2 to 3 carbon atoms) are preferably used.

The organic silicon compound having cyclic hydrocarbon group can be represented by the following general formula:

wherein A represents the foregoing cyclic hydrocarbon group such as a cyclopentadienyl group, a substituted cyclopentadienyl group, an indenyl group and a substituted indenyl group; R represents a hydrogen atom or a $C_{1-24}$, preferably $C_{1-12}$ hydrocarbon residue such as an alkyl group (e.g., methyl, ethyl, propyl, isopropyl and butyl), an alkoxy group (e.g., methoxy, ethoxy, propoxy and butoxy), an aryl group (e.g., phenyl), an aryloxy group (e.g., phenoxy) and an aralkyl group (e.g., benzyl); and L satisfies the relationship $1 \leq L \leq 4$, preferably $1 \leq L \leq 3$.

Specific examples of the organic cyclic hydrocarbon compound as component (3) include a $C_{5-24}$ cyclopolyene or a substituted cyclopolyene such as cyclopentadiene, methyl cyclopentadiene, ethyl cyclopentadiene, 1,3-dimethyl cyclopentadiene, indene, 4-methyl-1-indene, 4,7-dimethylindene, cycloheptatriene, methylcycloheptatriene, cyclooctatetraene, azulene, fluorene and methyl fluorene, monocyclopentadienylsilane, biscyclopentadienylsilane, triscyclopentadienylsilane, monoindenylsilane, bisindenylsilane, and trisindenylsilane.

The modified organic aluminum oxy compound containing Al—O—Al bond as catalyst component (4) is obtained by the reaction of the organic aluminum compound with water, which is a modified organic aluminum oxy compound commonly called aluminoxane obtained by the reaction of an alkyl aluminum compound with water. The modified organic aluminum oxy compound generally has from 1 to 100, preferably from 1 to 50 Al—O—Al bonds per molecule. The modified organic aluminum oxy compound may be linear or cyclic.

The reaction of the organic aluminum compound with water is generally effected in an inert hydrocarbon. Preferred examples of the inert hydrocarbon include aliphatic, alicyclic and aromatic hydrocarbon such as pentane, hexane, heptane, cyclohexane, benzene, toluene and xylene.

The ratio of water to organic aluminum compound to be reacted (water/Al molar ratio) is generally 0.25/1 to 1.2/1, preferably 0.5/1 to 1/1.

In the present invention, the catalyst obtained by allowing the foregoing catalyst components (1) to (4) to come into mutual contact with each other may be supported on an inorganic carrier and/or particulate polymer carrier to provide a catalyst for the polymerization reaction. The inorganic carrier may be in any form such as powder, grain, flake, foil and fiber so far as the predetermined shape can be maintained in the process for the preparation of the catalyst of the present invention. Whatever the form of the inorganic carrier is, the maximum length of the inorganic carrier is generally from 5 to 200 μm, preferably from 10 to 100 μm. The inorganic carrier is preferably porous. In general, the inorganic carrier generally has a surface area of from 50 to 1,000 m$^2$/g and a pore volume of from 0.05 to 3 cm$^3$/g.

Examples of the inorganic carrier of the present invention include a carbon substance, metal, metal oxide, metal chloride, metal carbonate or mixture thereof. Such an inorganic material is generally calcined at a temperature of from 200° C. to 900° C. in air or an inert-gas such as nitrogen and argon before use.

Examples of metals to be incorporated in the inorganic carrier include iron, aluminum, and nickel. Examples of the metal oxide include simple oxides or composite oxides of Groups I to VIII metals. Specific examples of these metal oxides include $SiO_2$, $Al_2O_3$, MgO, CaO, $B_2O_3$, $TiO_2$, $ZrO_2$, $Fe_2O_3$, $SiO_2$—$Al_2O_3$, $Al_2O_3$—MgO, $Al_2O_3$—CaO, $Al_2O_3$—MgO—CaO, $Al_2O_3$—MgO—$SiO_2$, $Al_2O_3$—CuO, $Al_2O_3$—$Fe_2O_3$, $Al_2O_3$—NiO, and $SiO_2$—MgO. The foregoing formulae representing metal oxides are not molecular formulae but only indicate the composition of the metal oxides. In other words, the structure and composition of the composite oxides to be used herein are not specifically limited. The metal oxide to be used herein may have a small amount of water content adsorbed thereto, and may contain a small amount of impurities.

Preferred examples of the metal chloride include chlorides of alkaline metal and alkaline earth metal. In particular, $MgCl_2$ and $CaCl_2$ are preferred. Preferred examples of the metal carbonate include carbonates of alkaline metal and alkaline earth metal. Specific examples of such metal carbonates include magnesium carbonate, calcium carbonate, and barium carbonate. Examples of the carbon substance include carbon black and activated carbon.

Any of the foregoing inorganic carriers may be preferably used in the present invention. In particular, metal oxides such as silica and alumina are preferred.

On the other hand, the particulate polymer carrier employable herein may be either a thermoplastic resin or thermosetting resin so far as it does not melt but stays solid during the preparation of catalyst and the polymerization reaction. The particle diameter of the particulate polymer carrier is normally from 5 to 2,000 μm, preferably from 10 to 100 μm. The molecular weight of the polymer carrier is not specifically limited so far as the polymer can occur in the form of solid substance during the preparation of catalyst and the polymerization reaction. Thus, the molecular weight of the polymer may range from a low value to an ultrahigh value.

Specific examples of the polymer to be used as particulate polymer carrier include ethylene polymer, ethylene-α-olefin copolymer, propylene polymer, propylene copolymer, various polyolefins such as poly-1-butene (preferably having from 2 to 12 carbon atoms), polyester, polyamide, polyvinyl chloride, polymethyl (meth)acrylate, polystyrene, polynorbornene, various natural high molecular compounds, and mixture thereof.

The foregoing inorganic carrier and/or particulate polymer carrier may be used as it is. Preferably, these carriers are previously brought into contact with an organic aluminum compound or a modified organic aluminum oxy compound having Al—O—Al bond before use.

The preparation of the ethylene-α-olefin copolymer of the present invention can be accomplished by a gas phase process, a slurry process, a solution process or the like and is not limited to a single-stage process, a multi-stage process, etc. The gas phase process is preferred.

The ethylene-α-olefin copolymer of the present invention has a relatively broad composition distribution despite its narrow molecular amount distribution; exhibits excellent mechanical properties, moldability, optical properties, electrical properties, and low temperature seal properties; and is suitable for preparation of films and various molded articles. Particularly, the copolymer is preferably used as films produced by T-die molding and inflation molding, such as wrapping films and raw films for laminates; a heat seal layer of the laminate; electrical insulating materials; and materials for various vessels.

The ethylene-α-olefin copolymer of the present invention produced by polymerization using the foregoing catalyst (H) exhibits particularly excellent thermal stability and chemical stability. The results of the rust test of such copolymers are lower than conventional resins and is generally 5.0 mg or less, preferably 3.0 mg or less. Accordingly, such copolymers exhibit excellent properties when used as wrapping material and container adapted for use with microwave oven or as electrical member, electrical parts, etc. Further, this copolymer is excellent in chemical stability required for ordinary use. Thus, this copolymer is suitable for food, hygienic and medical use.

The rust test used herein is conducted in the following manner:

The pelletized sample is melted over a 230° C. oil bath in a stream of nitrogen for 3 hours. A soft-iron plate having a surface area of 50 $cm^2$ is then dipped in the molten resin for 2 hours. The soft-iron plate is then withdrawn from the molten resin. The resin attached to the iron plate is then peeled off. The iron plate is then allowed to stand in a 80° C.-90 %RH constant temperature-humidity bath for 20 hours to accelerate rusting. The iron plate is then dried in a desiccator with silica gel for 1 day. The weight increase (mg) of the soft-iron plate is determined as the generated amount of rust.

The second aspect of the present invention is a polyolefin resin composition comprising (a) not less than 2% by weight of an ethylene-α-olefin copolymer according to the first aspect of the present invention and (b) not more than 98% by weight of a polyolefin. The foregoing polyolefin (b) is preferably an ethylene polymer or copolymer (b) which differs from the ethylene-α-olefin copolymer satisfying the requirements (A) to (E).

The other ethylene polymer (b) of the present invention may be an ethylene-α-olefin copolymer or an ethylene polymer or copolymer obtained by high pressure radical polymerization. A first preferred example (b1) of such an ethylene polymer is an ethylene homopolymer and an ethylene-α-olefin copolymer each having a density of from 0.86 to 0.97 $g/cm^3$ obtained by conventional ionic polymerization in the presence of a Ziegler catalyst or Phillips catalyst (hereinafter generically referred to as "Ziegler catalyst"). Specific examples of such an ethylene-α-olefin copolymer include high density polyethylene (HDPE), middle density polyethylene (MDPE), linear low density polyethylene (LLDPE), and very low density polyethylene (VLDPE).

The high density polyethylene, middle density polyethylene and low density polyethylene (HDPE, MDPE, LLDPE) of the present invention obtained in the presence of a Ziegler catalyst have a density of from 0.91 to 0.97 $g/cm^3$, preferably from 0.91 to 0.94 $g/cm^3$ (LLDPE), MFR of from 0.1 to 20 g/10 min, preferably from 0.3 to 15 g/10 min and Mw/Mn of from 2.5 to 7 preferably from 3 to 5.5.

The very low density polyethylene (VLDPE) of the present invention obtained in the presence of a Ziegler catalyst has a density of from 0.86 to 0.91 $g/cm^3$, preferably from 0.88 to 0.91 $g/cm^3$ and MFR of from 0.1 to 20 g/10 min, preferably from 0.3 to 15 g/10 min.

The very low density polyethylene (VLDPE) contains a polyethylene which exhibits properties intermediate between linear low density polyethylene (LLDPE) and ethylene-α-olefin copolymer rubber (EPR, EPDM). It is preferably a specific ethylene-α-olefin copolymer having a density of from 0.86 to 0.91 $g/cm^3$, a maximum peak temperature (Tm) of not lower than 60° C. as determined by differential scanning calorimetry and a boiling n-hexane-insoluble content of not less than 10% by weight. It is a resin comprising a high crystallinity moiety formed by linear low density polyethylene and an amorphous moiety formed by ethylene-α-olefin copolymer rubber in combination, obtained by the polymerization in the presence of a catalyst made of at least a solid catalyst component containing titanium and/or vanadium and an organic aluminum compound. This resin exhibits excellent mechanical strength and heat resistance inherent to the former moiety and excellent rubber elasticity and low temperature impact resistance inherent to the latter moiety which are well balanced.

The α-olefin to be incorporated in the ethylene-α-olefin copolymer prepared in the presence of a Ziegler catalyst has from 3 to 12, preferably from 3 to 10 carbon atoms. Specific examples of such an α-olefin include propylene, butene-1, 4-methylpentene-1, hexene-1, octene-1, decene-1, and dodecene-1.

The content of such an α-olefin in the copolymer is preferably not more than 40 mol%. The The second preferred example (b2) of the other ethylene polymer of the present invention is a low density polyethylene, ethylene-vinyl ester copolymer, or copolymer of ethylene with α,β-unsaturated carboxylic acid or derivative thereof, obtained by high pressure radical polymerization.

The foregoing low density polyethylene (LDPE) generally has MFR of from 0.1 to 20 g/10 min, preferably from 0.2 to 15 g/10 min. If MFR of the low density polyethylene falls within this range, the resulting composition exhibits a melt tension suitable enough to be formed into film. The foregoing low density polyethylene generally has a density of from 0.91 to 0.94 $g/cm^3$, preferably from 0.912 to 0.935 $g/cm^2$, more preferably from 0.912 to 0.930 $g/cm^3$ and a melt tension of from 1.5 to 25 g, preferably from 3 to 20 g. The melt tension is one of elastic properties of a resin. A resin having a melt tension falling within this range can be easily formed into film.

The foregoing low density polyethylene generally has Mw/Mn of from 3.0 to 10, preferably from 4.0 to 8.0.

The ethylene-vinyl ester copolymer which can be used in the present invention is a copolymer of a vinyl ester monomer mainly comprising ethylene prepared by high pressure radical polymerization, such as vinyl propionate, vinyl acetate, vinyl caproate, vinyl caprate, vinyl laurate, vinyl stearate and vinyl trifluoroacetate. Particularly preferred among these vinyl ester monomers is vinyl acetate (EVA). A copolymer comprising from 50 to 99.5% by weight of ethylene, from 0.5 to 50% by weight of vinyl ester and from 0 to 49.5% by weight of other copolymerizable unsaturated monomers is preferred. In particular, the content of vinyl ester is from 3 to 20% by weight, preferably from 5 to 15% by weight.

These copolymers generally have MFR of from 0.1 to 20 g/10 min, preferably from 0.3 to 10 g/10 min, and a melt tension of from 2.0 to 25 g, preferably from 3 to 20 g.

Representative examples of the copolymer of ethylene with α,β-unsaturated carboxylic acid or derivative thereof which can be used in the present invention include ethylene (meth)acrylic acid or its alkylester copolymer. Examples of the comonomers include acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, glycidyl acrylate, and glycidyl methacrylate. Particularly preferred among these comonomers are alkylesters such as methyl (meth)acrylate and ethyl (meth)acrylate (EEA). In particular, the content of ester (meth)acrylate is from 3 to 20% by weight, preferably from 5 to 15% by weight.

These copolymers generally have MFR of from 0.1 to 20 g/10 min, preferably from 0.3 to 10 g/10 min, and a melt tension of from 2.0 to 25 g, preferably from 3 to 20 g.

The mixing ratio of the polyolefin resin (b) may vary depending on the usage of the resin composition. For example, the ethylene-α-olefin copolymer (a) may be the main component in the field where the excellent strength, heat seal property and electrical property of the ethylene-α-olefin copolymer (a) is particularly required, whereas a large amount of the polyolefin resin (b) may be used in the field where the economical efficiency and moldability are important.

The third aspect of the present invention is a film comprising an ethylene-α-olefin copolymer according to the first aspect of the present invention or a resin composition according to the second aspect of the present invention.

When it is desired to provide the film of the present invention with improvements in transparency, low temperature heat-seal properties, mechanical strength, blocking resistance and anti-migration properties, the film preferably comprises (a) an ethylene-α-olefin copolymer according to the present invention alone or a composition comprising the copolymer as a main component. When it is desired to consider moldability and economy while maintaining these properties to some extent, the component (a) is preferably blended with the component (b). If the component (a) is blended with the component (b), the component (a) may be used in an amount of not less than 20% by weight while the component (b) may be used in an amount of not more than 80% by weight. If it is desired to provide the film with a well-balanced moldability while maintaining the mechanical strength, low temperature heat-seal properties and transparency, the component (a) is incorporated in an amount of from 50 to 98% by weight, preferably from 60 to 90% by weight while the component (b) is incorporated in an amount of from 2 to 50% by weight, preferably from 10 to 40% by weight. If the content of the component (a) falls below 20% by weight and the content of the component (b) exceeds 80% by weight, it may be disadvantageous in that the resulting film cannot fulfill its low temperature heat-seal properties and blocking properties.

The film of the present invention can be produced by processing the foregoing component (a) and/or component (b) by a blown film extruding method, a T-die extruding method or the like. The film thus molded exhibits excellent lubricating property, blocking resistance, low temperature heat-seal properties, transparency and mechanical strength. The film is little apt to migration of resin components to the content wrapped. The film can be singly formed into various wrapping materials, wrapping bags or containers. By making the best use of its excellent heat-seal properties, the film can find application in heat seal. The thickness of the film generally ranges from 3 to 500 μm, though depending on the purpose.

The fourth aspect of the present invention is a laminate comprising an ethylene-α-olefin copolymer according to the first aspect of the present invention or a resin composition according to the second aspect of the present invention. The laminate of the present invention is a multilayer laminate comprising a layer of the ethylene-α-olefin copolymer or the resin composition with a layer of other materials, preferably a gas barrier material layer.

The other materials to be laminated may vary with the purpose required. Examples of these materials which have gas barrier properties such as those for food wrapping include gas barrier materials, e.g., polyamide resin such as 6-nylon and 6,6-nylon, polyester resin such as polyethylene terephthalate and polybutylene terephthalate, saponification product of ethylene-vinyl acetate copolymer, vinylidene chloride resin, polyvinyl alcohol resin, polycarbonate resin, material obtained by metallizing these resins with aluminum, and metal foil such as aluminum and copper. The laminate comprising the ethylene-α-olefin copolymer or the resin composition and such a gas barrier material is suitable for producing containers for foods, medical drags, clothes, etc. Examples of other materials to be laminated include materials for enhancing nerve, e.g., for making-self-supporting container or making bag at a high speed, such as high density polyethylene, polypropylene, and polybutene-1. Further, two or more of these materials may be properly laminated with each other.

Examples of methods for laminating these materials include extrusion lamination method, dry lamination method, sand lamination method, T-die co-extrusion method, and blown film co-extrusion inflation method. For the film of the present invention, dry lamination method is particularly preferred. When T-die co-extrusion method, co-extrusion method or the like is used, LLDPE graft-modified with a monomer having a polar group such as maleic anhydride or an ionomer resin, or a mixture thereof may be used as an intermediate adhesive layer.

In the laminate of the present invention, the layer of the ethylene-α-olefin copolymer or the resin composition of the present invention is preferably a heat seal layer. The heat seal layer needs to exhibit excellent low temperature heat-seal properties and heat-sealing strength. The laminated thickness of the heat seal layer depends on the purpose. It is generally from 3 to 250 μm, preferably from 5 to 200 μm, more preferably from 10 to 180 μm. The film thus laminated may be further laminated with a base film having a thickness of from 3 to 200 μm or a plurality of films having a thickness similar to the base film.

Another embodiment of the laminate of the present invention include a multi-layer film having excellent heat-seal properties and nerve comprising a film of the present invention as a surface layer and a middle density polyethylene as an inner layer; an inexpensive multi-layer film having excellent heat-seal properties comprising a film of the present invention as a surface layer and a regenerated polyethylene as an inner layer; and combinations thereof.

The film or laminate according to the present invention preferably comprises an aliphatic amide (c) incorporated therein in an amount of from 0.03 to 0.25 parts by weight per 100 parts by weight of the ethylene-α-olefin copolymer according to the present invention or the resin composition of the present invention comprising the ethylene-α-olefin copolymer (a) and the polyolefin resin (b).

The purpose of the aliphatic amide (c) used in the present invention is to improve the lubricating property of the foregoing film. Thus, a laminating film which is not apt to deterioration of peelability and lubricating property can be provided.

When such an aliphatic amide is used, care should be taken to prevent the aliphatic amide from having adverse effects on the adhesiveness between the film of the copolymer or resin composition of the present invention and the base film. Among aliphatic amides, (c1) an unsaturated aliphatic bisamide and (c2) an unsaturated aliphatic amide having a melting point of from 65° C. to 90° C. may be blended in an amount of from 0.01 to 0.2 parts by weight each, with the proviso that the total amount of (c1) and (c2) is from 0.03 to 0.25 parts by weight, to provide the resulting film with an enhanced lubricating property without impairing the adhesiveness to the base film. Thus, these aliphatic amides are preferably used to provide a film particularly suitable for dry lamination.

Examples of the foregoing unsaturated aliphatic bisamide (c1) include ethylenebisoleic amide, ethylenebiserucic amide, hexamethylenebisoleic amide, N,N'-dioleyladipic amide, and N,N'-dioleylsebacic amide. Such an unsaturated aliphatic bisamide is generally incorporated in an amount of from 0.01 to 0.2 parts by weight per 100 parts by weight of the resin components. If the amount of such an unsaturated aliphatic bisamide falls below 0.01 parts by weight, the resulting resin tends to exhibit reduced lubricating property and blocking resistance. If the amount of such an unsaturated aliphatic bisamide exceeds 0.2 parts by weight, the resulting resin tends to disadvantageously exhibit a reduced adhesiveness to the laminating materials described layer.

The melting point of the unsaturated aliphatic amide having a melting point of from 65° C. to 90° C. (c2) is measured by means of a differential scanning calorimeter (DSC) while the temperature is being raised at a rate of 10° C./min. Examples of such an unsaturated aliphatic amide include erucic amide, and oleic amide. If the melting point of the unsaturated aliphatic amide falls below 65° C., the resulting resin tends to disadvantageously exhibit deteriorated blocking resistance. If the melting point of the unsaturated aliphatic amide exceeds 90° C., the resulting resin tends to disadvantageously fail to exhibit sufficiently improved lubricating property. The amount of the unsaturated aliphatic amide (c2) to be incorporated is generally from 0.01 to 0.2 parts by weight per 100 parts by weight of the resin components, with the proviso that the total amount of the component (c1) and the component (c2) is generally from 0.03 to 0.25 parts by weight. If the amount of the component (c2) falls below 0.01 parts by weight, the resulting resin tends to exhibit an insufficient lubricating property. If the amount of the component (c2) exceeds 0.25 parts by weight, the resulting resin tends to exhibit an insufficient adhesiveness to the laminating materials. If the total amount of the component (c1) and the component (c2) falls below 0.03 parts by weight, the resulting resin tends to exhibit insufficient lubricating property and blocking resistance. If the total amount of the component (c1) and the component (c2) exceeds 0.25 parts by weight, the resulting resin tends to exhibit an insufficient adhesiveness to the laminating materials.

The fifth aspect of the present invention is an electrical insulating material comprising an ethylene-α-olefin copolymer according to the first aspect of the present invention or a resin composition according to the second aspect of the present invention.

The sixth aspect of the present invention is a power cable comprising a conductor having thereon an insulating layer comprising an electrical insulating material according to the fifth aspect of the present invention.

In the electrical insulating material according to the present invention, the amount of the other polyolefin (b) to be incorporated is from 0 to 98% by weight based on the total amount of the ethylene-α-olefin copolymer (a) and the other polyolefin (b). When it is desired to maintain the excellent electrical properties of the ethylene-α-olefin copolymer (a), the ethylene-α-olefin copolymer (a) is preferably blended in an amount of from 70 to 100% by weight. When it is desired to make the best use of the moldability or economy of the polyolefin (b), the ethylene-α-olefin copolymer (a) is preferably blended in an amount of from 2 to 70% by weight.

If the electrical insulating material is crosslinked before use as described later, it is preferred that the ethylene-α-olefin copolymer (a) and the other polyolefin (b) be incorporated in an amount of from 10 to 30% by weight and from 70 to 90% by weight, respectively.

When the foregoing ethylene-α-olefin copolymer (a) according to the present invention exhibits an electrical activation energy of not more than 0.4 eV, it is useful as an electrical insulating material. The ethylene-α-olefin copolymer having an electrical activation energy of not more than 0.4 eV exhibits excellent electrical properties as described foregoing.

The electrical insulating material according to the present invention can be used as an insulating materials for capacitors, high voltage parts in X-ray generators, various measuring instruments, dry or wet battery containers, various printed boards, various connectors, wiring cords, and globes or tools for handling high voltage.

The power cable of the present invention comprises an insulating layer comprising the foregoing electrical insulating material, which is preferably crosslinked.

Specific examples of the foregoing power cable include a power cable comprising a conductor coated with an insulating layer comprising at least the crosslinked electrical insulating material of the present invention. If necessary, the conductor may be made of an assembly of wires. A semiconductor layer may be provided interposed between the conductor and the insulating layer. A fire retardant resin layer may be provided outside the insulating layer.

The electrical insulating material of the present invention can exert marked effects particularly on high voltage.

In the power cable of the present invention, the insulating layer is preferably crosslinked upon coating. In order to crosslink the insulating layer, the insulating material which has previously comprised a radical generator incorporated therein may be heated so that it is crosslinked. Alternatively, the insulating material may be radiation-crosslinked.

Examples of the radical generator include peroxides such as benzoyl peroxide, lauryl peroxide, dicumyl peroxide, t-butylhydroperoxide, α-α-bis(t-butylperoxydiisopropyl) benzene, di-t-butylperoxide, 2,5-dimethyl-2,5-di-(t-butylperoxy)hexane, 2,5-dimethyl-2,5-di-(t-butylperoxy) hexyne and azobisisobutylonitrile, 2,3-dimethyl-2,3-diphenylbutane, 2,3-diethyl-2,3-diphenylbutane, 2,3-diethyl-2,3-di(p-methylphenyl)butane, and 2,3-diethyl-2,3-di (bromophenyl)butane.

Preferred among the foregoing radical generators are 2,5-dimethyl-2,5-di-(t-butylperoxy)hexane, 2,5-dimethyl-2,5-di-(t-butylperoxy)hexyne, and dicumylperoxide. The amount of such a radical generator to be incorporated is normally from 0.01 to 5 parts by weight, preferably from 0.1 to 3 parts by weight per 100 parts by weight of the resin components.

The insulating layer which has been molded may be allowed to cool or forcedly cooled in a water bath or the like.

It is preferred that the insulating layer which has been molded be cooled at a relatively-slow rate to prevent the generation of voids in the insulating layer.

The crosslinked insulating material according to the present invention exhibits an excellent insulation properties and elastic properties and is thus most suitable for sheathing of cable. It can be widely used regardless of whether it is applied to direct current or alternating current power supply. The crosslinked insulating material according to the present invention exhibits a small temperature dependence of volume resistance and excellent electrical properties and thus can be used for high voltage direct current power cable.

The present invention will be further described in the following examples, but the present invention should not be construed as being limited thereto.

The testing methods used in Examples 1 to 10 and Comparative Examples 1 to 8 are as follows:

Method for testing physical properties

Density:
  Measured in accordance with JIS K6760

MFR:
  Measured in accordance with JIS K6760

Measurement by DSC:
  The specimen was molded by a hot press to prepare a 0.2-mm thick sheet. The sheet was then stamped out to prepare a sample with a weight of about 5 mg. The sample was then allowed to stand at 230° C. for 10 minutes. The sample was cooled to 0° C. at a rate of 2° C./min, and then heated to 170° C. at a rate of 10° C./min. The temperature at the top of the resulting maximum temperature peak indicated the maximum peak temperature Tm.

Mw/Mn:
  GPC Waters 150 Type
  Solvent: ODCB 135° C.
  Column: GMHHR-H (S), available from Toso Co., Ltd.

NMR:
  Measured by means of GX-270 available from Jeol Ltd. with ODCB at 135° C.

Inflation film molding

A copolymer powder obtained by polymerization was pelletized. The pelletized copolymer was then processed by a LLDPE film molding machine (diameter: 50 mm) equipped with a die having a diameter of 100 mm and a lip gap of 2 mm at a blow ratio of 1.9, a take-off speed of 20 m/min and a molding temperature of 200° C. to provide a film having a thickness of 30 μm.

Evaluation of film properties

Dart impact strength:
  Measured in accordance with ASTM D 1709

Tensile modulus:
  The specimen was set on a tensile tester. The specimen was then pulled at a rate of 5 mm/min. The tensile modulus was then determined from the stress and sectional area developed when the specimen was elongated by 1%.

Haze:
  Measured in accordance with ASTM D1003-61

Gloss:
  Measured in accordance with JIS Z8741

Hot tack properties:
  An ether anchor coat agent was applied to a 15-μm thick nylon-based film. The copolymer film prepared by the foregoing film molding method was then dry-laminated on the nylon-based film to obtain a composite film. The film thus obtained was then cut into a 25-mm wide web. The web was then clamped by a hot-plate type heat-seal tester having a seal bar width of 5 mm. A 45 g load was suspended from one end of the composite film via a pulley. A stack of two sheets of the composite film were then heat-sealed at a seal pressure of 2 kg/cm$^2$ for 0.5 seconds. Sealing was then finished by opening the seal bar. At the same time, the film was loaded to peel the sealed area. The sealing was conducted at various temperatures. The relationship between temperature and peeled distance was then determined. The wider the range of sealing temperature at which a sealed area that was peeled at a short distance can be made was, the better were the hot tack properties.

Sheet molding method
  The copolymer was homogenized by means of a roll, and then cut into chips. The chips were then press-molded at a temperature of 180° C. to obtain a sheet.

Conditions of molding of specimen by injection molding machine
  Injection molding machine: JSW100 (clamping force: 100 ton), available from Japan Steel Works, Ltd.
  Resin molding temperature: 220° C.
  Cushion molding mold temperature: 50° C.

Evaluation of sheet and injection-molded specimen

Tensile impact test:
  Determined in accordance with ASTM D1822

Tensile modulus:
  The specimen was set on a tensile tester. The specimen is then pulled at a rate of 5 mm/min. The tensile modulus was then determined from the stress and sectional area developed when the specimen was elongated by 1%.

Tensile yield strength, breaking strength, tensile elongation:
  Determined in accordance with JIS K6760
  The specimens A1 to A5 used in Examples 1 to 5 were prepared by the following polymerization methods:

Preparation of solid catalyst
  Purified toluene was charged into a catalyst making apparatus (No. 1) equipped with an electromagnetically-induced agitator in an atmosphere of nitrogen. 28 g of dipropoxy dichlorozirconium ($Zr(OPr)_2Cl_2$) and 48 g of methylcyclopentadiene were then charged into the catalyst making apparatus. 45 g of tridecyl aluminum was then added dropwise to the system while the system was being kept at a temperature of 0° C. After the completion of dropwise addition, the reaction system was stirred while the temperature thereof was being kept to 50° C. for 16 hours to obtain Solution A. Separately, purified toluene was charged into another catalyst making apparatus (No. 2) equipped with an agitator in an atmosphere of nitrogen. Into the catalyst making apparatus were then poured Solution A and a toluene solution of 6.4 mol of methyl aluminoxane to effect reaction. Thus, Solution B was obtained.

Subsequently, purified toluene was charged into the catalyst making apparatus equipped with an agitator (No. 1) in an atmosphere of nitrogen. To the system was then added 1,400 g of silica (available from Fuji Davison Co., Ltd.; grade: #952; surface area: 300 m$^2$/g) which had been calcined at 400° C. for a predetermined period of time. To the reaction mixture was then the total amount of Solution B. The reaction mixture was then stirred at room temperature. Nitrogen was then blown through the reaction mixture to remove the solvent therefrom. As a result, a solid catalyst powder having a good fluidity was obtained as Catalyst C.

Preparation of specimen A1
  Ethylene and 1-butene were copolymerized at a polymerization temperature of 70° C. and a total pressure of 20 kgf/cm²G by means of a continuous fluidized bed gas phase polymerization apparatus. The gas composition in the system had 1-butene/ethylene molar ratio of 0.12 and an ethylene concentration of 60 mol %. The polymerization process was effected with Catalyst C being continuously supplied. In order to keep the gas composition in the system constant, the various gases were continuously supplied into the system.

The physical properties of the copolymer thus produced are set forth in Table 1.

Preparation of specimen A2

Polymerization was effected in the same manner as in A1 except that 1-butene/ethylene molar ratio was changed. The physical properties of the copolymer thus produced are set forth in Table 1 together with the results of the experiment.

Preparation of specimens A3 to A5

Polymerization was effected in the same manner as in A1 except that the comonomer was changed to 1-pentene, 1-hexene and 4-methyl-pentene-1 to prepare specimens A3 to A5, respectively. The physical properties of the copolymer thus produced are set forth in Table 1 together with the results of the experiment.

Preparation of specimens A6 to A9

Polymerization was effected in the same manner as in A1 except that 1-butene/ethylene molar ratio was changed. The physical properties of the copolymers thus produced are set forth in Tables 2 to 4 together with the results of the experiment.

Preparation of specimen B2

Into a 50-l pressure reactor with an agitator in which the air had been replaced by nitrogen was charged 25 l of purified toluene. To the contents of the reactor was then added 183 g of butene-1. To the reaction mixture was then added a mixture of bis(n-butylcyclopentadienyl)zirconium dichloride and methyl alumoxane (MAO) (Al/Zr molar ratio: 500) in such an amount that the amount of Zr reached 0.33 mmol. The reaction mixture was then heated to a temperature of 80° C.. Into the reactor was then charged ethylene in such a manner that the pressure reached 9 kg/cm²G where the polymerization of the reaction mixture was initiated. The polymerization process lasted for 1 hour while the total pressure was being kept to 9 kg/cm²G by continuously polymerizing ethylene. Thus, a copolymer was prepared. The physical properties of the copolymer thus prepared are set forth in Table 1 together with the results of the experiment.

Preparation of specimen B5

The polymerization procedure of B2 was followed except that 410 g of 1-butene was added. The physical properties of the copolymer thus prepared are set forth in Table 3 together with the results of the experiment.

The other specimens B1, B3, B4 and B6 were LLDPE or VLDPE obtained by the gas phase or slurry copolymerization of ethylene and 1-butene in the presence of a catalyst prepared from titanium tetrachloride and triethyl aluminum. The physical properties of these copolymer thus prepared are set forth in Tables 1 to 4 together with the results of the experiment.

EXAMPLES 1 TO 5

Table 1 shows the comparison of various physical properties of film products obtained by the inflation extrusion of pellets prepared by the foregoing procedure.

COMPARATIVE EXAMPLES 1 TO 3

For comparison with Examples 1 to 5, the resins set forth in Table 1 were processed in the same manner as in Examples 1 to 5. The results are set forth in Table 1. As can be seen in Table 1, Comparative Example 1 exhibited poor dart impact strength and transparency. Comparative Example 2 exhibited a low melting point and a reduced heat resistance. Further, Comparative Examples 3 was inferior to Examples 3 and 4 in dart impact strength and transparency taking into account the kind of α-olefin used.

EXAMPLE 6 AND COMPARATIVE EXAMPLES 4 AND 5

The film product obtained in Example 2 was measured for hot tack properties. The results were then compared with that of Comparative Examples 4 and 5 determined from the film products obtained in Comparative Examples 1 and 2. The results are set forth in Table 3. Example 6 exhibited a wide sealing temperature range within which the sealed area can be peeled at a short distance.

EXAMPLES 7 AND 8 AND COMPARATIVE EXAMPLES 6 AND 7

Sheets were molded by the foregoing method. These sheets were then subjected to physical experiments. The results are set forth in Table 3. Comparative Example 6 exhibited a poor tensile impact strength. Comparative Example 7 exhibited a poor heat resistance.

EXAMPLES 9 AND 10 AND COMPARATIVE EXAMPLE 8

Specimens were molded by the foregoing injection molding method. These specimens were then subjected to physical experiments. The results are set forth in Table 4. Comparative Example 8 exhibited poor tensile impact strength and tensile break strength.

TABLE 1

| | (Film test) | | | | | | | |
|---|---|---|---|---|---|---|---|---|
| | Example | | | | | Comparative Example | | |
| | 1 | 2 | 3 | 4 | 5 | 1 | 2 | 3 |
| Resin | A1 | A2 | A3 | A4 | A5 | B1 | B2 | B3 |
| Density (g/cm³) | 0.911 | 0.919 | 0.918 | 0.92 | 0.918 | 0.922 | 0.921 | 0.923 |
| MFR (g/10 min) | 1.4 | 1.6 | 1.5 | 1.4 | 1.5 | 2.0 | 1.2 | 1.1 |
| Comonomer | C4 | C4 | C5 | C6 | isoC6 | C4 | C4 | C6 |
| Mw/Mn | 2.3 | 2.6 | 2.9 | 2.6 | 2.4 | 4.3 | 2.3 | 4.1 |
| Cb | 1.16 | 1.27 | 1.31 | 1.38 | 1.34 | 1.60 | 1.05 | 2.10 |
| ODCB (wt %) | 2.7 | 0.8 | 1.2 | 1.6 | 1.8 | 3.7 | 0.7 | 5.8 |
| X (calculated) (wt %) | 6.0 | 3.6 | 3.8 | 3.2 | 3.8 | 2.6 | 2.9 | 2.5 |

TABLE 1-continued (Film test)

| | Example | | | | | Comparative Example | | |
|---|---|---|---|---|---|---|---|---|
| | 1 | 2 | 3 | 4 | 5 | 1 | 2 | 3 |
| Maximum melting point Tm (°C.) | 115 | 119 | 118 | 119 | 118 | 123 | 113 | 125 |
| TREF peak | plural | plural | plural | plural | plural | plural | single | plural |
| Dart impact strength (g) | 306 | 185 | 296 | 319 | 303 | 82 | 142 | 190 |
| Tensile modulus (kg/cm$^2$) | | | | | | | | |
| MD | 1,310 | 2,010 | 2,140 | 2,590 | 2,210 | 2,090 | 1,810 | 2,390 |
| TD | 1,350 | 2,050 | 2,210 | 2,860 | 2,260 | 2,280 | 1,820 | 2,720 |
| Haze (%) | 3.5 | 3.1 | 6.2 | 7.5 | 6 | 5.5 | 3.1 | 12.3 |
| Gloss (%) | 125 | 130 | 102 | 96 | 92 | 110 | 125 | 90 |

TABLE 2

(Hot tack property test)
Peeled length of heat-sealed area (mm)

| | Heat sealing temperature (°C.) | | | | | | | | | | | | |
|---|---|---|---|---|---|---|---|---|---|---|---|---|---|
| | 105 | 110 | 115 | 120 | 125 | 130 | 135 | 140 | 145 | 150 | 155 | 160 | 170 |
| Example 6 | 30 | 28.3 | 12.7 | 3.5 | 2.6 | 2.3 | 2 | 2.2 | 3.4 | 4 | 5.2 | 10.5 | 18.5 |
| Comparative Example 4 | — | — | — | 30 | 23.1 | 8.9 | 5.8 | 5.2 | 5.4 | 6.3 | 7.5 | 9.1 | 14 |
| Comparative Example 5 | 30 | 30 | 17.2 | 2 | 2.2 | 3.5 | 5.5 | 6.9 | 8.1 | 9.3 | 17.2 | 27.5 | 30 |

TABLE 3

(Sheet property test)

| | Example | | Comparative Example | |
|---|---|---|---|---|
| | 7 | 8 | 6 | 7 |
| Resin | A6 | A7 | B4 | B5 |
| Density (g/cm$^3$) | 0.903 | 0.912 | 0.907 | 0.906 |
| MFR (g/10 min) | 4.5 | 4.7 | 4.9 | 4.5 |
| Comonomer | C4 | C4 | C4 | C4 |
| Mw/Mn | 2.5 | 2.5 | 4.5 | 2.6 |
| Cb | 1.18 | 1.58 | 2.41 | 1.02 |
| ODCB (wt %) | 2.4 | 2.1 | 16.3 | 1.5 |
| X (calculated) (wt %) | 12.2 | 7.4 | 10.0 | 10.4 |
| Maximum melting point Tm (°C.) | 113 | 117 | 118 | 96 |
| Number of TREF peaks | plural | plural | plural | single |
| Tensile impact strength (kgcm/cm$^2$) | 910 | 580 | 290 | 1,010 |
| Tensile modulus (kg/cm$^2$) | 710 | 960 | 680 | 570 |

TABLE 4

(Injection-molded specimen test)

| | Example | | Comparative Example |
|---|---|---|---|
| | 9 | 10 | 8 |
| Resin | A8 | A9 | B6 |
| Density (g/cm$^3$) | 0.915 | 0.921 | 0.919 |
| MFR (g/10 min) | 23 | 32 | 26 |
| Comonomer | C4 | C4 | C4 |
| Mw/Mn | 2.6 | 2.7 | 3.8 |
| Cb | 1.19 | 1.17 | 1.63 |
| ODCB (wt %) | 4.1 | 2.6 | 13.5 |
| X (calculated) (wt %) | 8.6 | 6.2 | 6.9 |
| Maximum melting point Tm (°C.) | 112.6 | 115.5 | 125 |
| Number of TREF peaks | plural | plural | plural |
| Tensile impact strength (kgcm/cm$^2$) | 231 | 127 | 99 |
| Tensile yield strength (kg/cm$^2$) | 83 | 95 | 86 |
| Tensile break strength (kg/cm$^2$) | 136 | 125 | 98 |
| Tensile elongation (%) | 700 | 750 | 600 |

The testing methods used in Examples 11 to 20 and Comparative Examples 9 to 11 will be described hereinafter.

Physical properties test

All the tests were conducted in the same manner as in Examples 1 to 10 and Comparative Examples 1 to 8.

T-die molded film evaluation method

Haze:

Measured in accordance with ASTM D1003

Tensile modulus:

Measured in accordance with ASTM D882

Tensile impact strength test:
  Measured in accordance with ASTM D1822.MD (extrusion direction) strength was measured.

Blocking resistance:
  Two sheets of 20-mm wide webs cut from the film were stacked over a length of 5 cm. The stack was then allowed to stand under a load of 10 kg in an oven at 50° C. for 48 hours. The specimen was the then conditioned at room temperature (23° C.) and a humidity of 50% for 24 hours. The specimen was then pulled at a rate of 500 mm/min by means of a tensile tester to measure the load.

Low temperature heat-seal properties:
  By using a heat-seal tester (available from Tester Sangyo Co., Ltd.), the specimen was heat-sealed at a seal bar width of 1 mm and a pressure of 2 kg/cm² for 1 second at intervals of 5° C., and then allowed to cool. The sealed area was then cut into 1.5-mm wide webs. The web specimen was then peeled at a rate of 300 mm/min by means of a tensile tester. The temperature at which the load required was 500 g is determined by interpolation.

Container evaluation method
Flexibility:
  The contents-release characteristics are visually observed.
  A: Relatively good
  C: Poor Heat resistance:
  The container filled with distilled water was subjected to high pressure steam sterilization at a temperature of 121° C. for 20 minutes. The container thus treated was then visually observed for deformation.
  A: Not deformed
  B: Slightly deformed
  C: Remarkably deformed Drop test:
  Ten containers filled with distilled water which had been adjusted to 5° C. were dropped from a height of 1.2 m. The number of ruptured containers was determined.
  A: No ruptured containers
  B: 1 or 2 ruptured containers T-die film molding conditions
Make of apparatus used: Union Plastic Co., Ltd.
Extruder screw diameter: 30 mm
T-die: 300 mm face
Number of revolutions of screw: 80 rpm
Extrusion rate: 6.5 kg/hr
Die lip gap: 2.0 mm
Take-off speed: 1.7 m/min
Molded resin temperature: 220° C.
Film thickness: 300 μm
Chill-roll temperature: 40° C.
Screen mesh: 80 mesh/120 mesh/80 mesh Specimens A10 to A15 were prepared by the following polymerization methods:
Preparation of solid catalyst
  The procedure of Examples 1 to 10 was followed to obtain Catalyst C.
Preparation of specimens
  Polymerization was conducted in the same manner as in specimens A1 to A9. The properties thereof are shown in Table 5.

Other ethylene polymers
HDPE:
  High density polyethylene (prepared by slurry process in the presence of a Ziegler catalyst) available from Japan Polyolefins Co., Ltd.

VL:
  Very low density polyethylene polymer (prepared by gas phase process in the presence of a Ziegler catalyst) (Comonomer: 1-butene) available from Japan Polyolefins Co., Ltd.

HPLD:
  High pressure process low density polyethylene available from Japan Polyolefins Co., Ltd.

EVA:
  High process ethylene-vinyl acetate copolymer (vinyl) acetate content: 5%) available from Japan Polyolefins Co., Ltd.

EEA:
  High pressure process ethylene-vinyl acetate copolymer (vinyl) acetate content: 5%) available from Japan Polyolefins Co., Ltd.

The properties of the above polymers are shown in Table 6.

EXAMPLE 11

80 parts by weight of specimens A10, 20 parts by weight of HPLD, 0.24 part by weight of Irganox 1076 (available from Ciba Geigy Co., Ltd.), 0.12 part by weight of Irgaphos 168 (available from Ciba Geigy Co., Ltd.), and 0.1 part by weight of calcium stearate (available from NOF Corporation) were uniformly mixed by a Henschel mixer, and the mixture was /made into pellets. The pellets were molded into a sheet having a thickness of 0.5 mm by pressing to subject to measurements for tensile modulus, tensile impact strength and haze. Separately, the pallets were subjected to T-die molding under the above conditions to obtain a film having a thickness of 50 μm to subject to measurements for blocking strength and low temperature heat-seal property. The results obtained are shown in Table 7.

EXAMPLES 12 TO 16

The same procedures as in Example 11 were repeated except that the polymers shown in Tables 5 and 6 were used. The results obtained are shown in Table 7.

EXAMPLE 17

A container (content: 500 ml) was prepared by using a film obtained in Example 11 using specimen A10 and HDPE by heat-sealing. The resulting container was evaluated in the manner described above. The results obtained are shown in Table 8.

EXAMPLES 18 TO 20

The same procedures as in Example 17 were repeated except that the polymers shown in Tables 5 and 6 were used. The results obtained are shown in Table 8.

COMPARATIVE EXAMPLE 9

The same procedures as in Example 11 were repeated except that the polymers shown in Tables 5 and 6 were used. The results obtained are shown in Table 7.

COMPARATIVE EXAMPLES 10 AND 11

The same procedures as in Example 17 were repeated except that the polymers shown in Tables 5 and 6 were used. The results obtained are shown in Table 8.

TABLE 5

(Ethylene-α-olefin copolymers)

| | Specimen | | | | | |
|---|---|---|---|---|---|---|
| | A10 | A11 | A12 | A13 | A14 | A15 |
| MFR (g/10 min) | 3.0 | 3.0 | 3.0 | 6.0 | 3.0 | 3.0 |
| Density (g/cm$^3$) | 0.920 | 0.912 | 0.924 | 0.920 | 0.935 | 0.886 |
| Mw/Mn | 2.6 | 2.6 | 2.6 | 2.5 | 2.5 | 2.7 |
| ODCB (wt %) | 1.0 | 2.6 | 0.8 | 1.2 | 0.5 | 12.7 |
| X (calculated) (wt %) | 3.87 | 6.66 | 2.76 | 4.58 | 2.0 | 26.0 |
| Cb | 1.21 | 1.17 | 1.24 | 1.22 | 1.38 | 1.14 |

TABLE 6

(Other ethylene polymers)

| | HDPE | VL | HPLD | EVA | EEA |
|---|---|---|---|---|---|
| MFR (g/10 min) | 5.3 | 3.0 | 1.0 | 1.5 | 1.4 |
| Density (g/cm$^3$) | 0.963 | 0.905 | 0.924 | 0.932 | 0.933 |
| Mw/Mn | — | 4.5 | — | — | — |
| ODCB (wt %) | 0.6 | 27.3 | — | — | — |
| X (calculated) (wt %) | — | 10.1 | — | — | — |
| Cb | — | 1.28 | — | — | — |

TABLE 7

(Evaluation of film)

| | Example | | | | | | Comparative Example |
|---|---|---|---|---|---|---|---|
| | 11 | 12 | 13 | 14 | 15 | 16 | 9 |
| Composition (ratio (wt %)) | A10 (80) HPLD (20) | A12 (80) HPLD (20) | A13 (80) HPLD (20) | A10 (80) EVA (20) | A10 (80) EEA (20) | A14 (65) HPLD (35) | VL (100) — |
| Haze (%) | 10.6 | 13.4 | 10.5 | 10.2 | 10.1 | 10.2 | 11.6 |
| Tensile modulus (kg/cm$^2$) | 1,230 | 1,310 | 1,210 | 1,360 | 1,290 | 1,310 | 520 |
| Tensile impact strength (kgcm/cm$^2$) | 610 | 490 | 570 | 590 | 600 | 480 | 450 |
| Blocking strength (g) | 590 | 320 | 620 | 710 | 690 | 560 | 1,620 |
| Low temperature heat-seal property (°C.) | 147 | 148 | 147 | 147 | 147 | 148 | 146 |

TABLE 8

| | Example | | | | Comparative Example | |
|---|---|---|---|---|---|---|
| | 17 | 18 | 19 | 20 | 10 | 11 |
| Composition (ratio (wt %)) | A10 (80) HDPE (20) | A11 (80) HDPE (20) | A13 (80) HDPE (20) | A15 (65) HDPE (35) | VL (80) HDPE (20) | VL (6.5) HDPE (35) |
| Heat resistance | A | A | A | A | C | C |
| Flexibility | A | A | A | A | A | A |
| Drop test | A | A | A | A | B | B |
| Total evaluation | A | A | A | A | C | C |

EXAMPLES 21 TO 29 AND COMPARATIVE EXAMPLES 12 TO 15

The testing methods used in Examples 21 to 29 and Comparative Examples 12 to 15 will be described hereinafter.

Physical properties test

All the tests were conducted in the same manner as in Examples 1 to 10 and Comparative Examples 1 to 8.

T-die molding film formation conditions

Make of apparatus used: Union Plastic Co., Ltd.

Extruder screw diameter: 30 mm

T-die: 300 mm face

Number of revolutions of screw: 50 rpm

Die lip gap: 1.2 mm

Take-off speed: 6 m/min

Molded resin temperature: 210° to 220° C.

Film thickness: 50 μm

Evaluation of T-die molded film Properties

Haze (%):

Measured in accordance with ASTM D1003-61

Gloss (%):

Measured in accordance with JIS Z8741

Low temperature heat-seal properties:

Using a heat-sealer available from Tester Sangyo Co., Ltd., the specimen was heat-sealed at a pressure of 2 kg/cm$^2$G for 1 second at some properly selected temperatures. This film was then cut into a 15-mm wide web. The web specimen was then subjected to peel test at a peeling rate of 300 mm/min. The low temperature heat-seal properties were represented by the temperature value at which the peel strength of the specimen was 500 g, determined by interpolation. The lower this temperature value was, the better were the low temperature heat-seal properties.

Sheet molding method

The copolymer was homogenized by means of a roll, and then cut into chips. The chips were then press-molded at a temperature of 180° C. to obtain a sheet.

Evaluation of sheet specimen

Tensile impact strength:

Measured in accordance with ASTM D1822

Tensile modulus:

The specimen was set on a tensile tester. The specimen was then pulled at a rate of 5 mm/min. The tensile modulus was then determined from the stress and sectional area developed when the specimen was elongated by 1%.

Rust testing method

To the specimen powder were added 0.10% by weight of tetrakis-[methylene-3-(3',5'-di-tertiary butyl)-4'-hydroxyphenyl)propionate]methane (trade name: Irganox 1010) as a phenolic oxidation inhibitor and 0.10% by weight of tris(2,4-di-t-butylphenyl)phosphite (trade name: Irgaphos 168) as a phosphite oxidation inhibitor. The mixture was then pelletized.

The specimen thus pelletized was then melted over a 230° C. oil bath in a stream of nitrogen for 3 hours. A soft-iron plate having a surface area of 50 Cm$^2$ was then dipped in the molten resin for 2 hours. The soft-iron plate was then withdrawn from the molten resin. The resin attached to the iron plate was then peeled off. The iron plate was then allowed to stand in a 80° C.-90%RH constant temperature-humidity bath for 20 hours to accelerate rusting. The iron plate was then dried in a desiccator with silica gel for 1 day. The weight increase (mg) of the soft-iron plate indicated the generated amount of rust.

Measurement of volume resistance

1. Preparation of specimen to be measured for volume resistance

A blend of the ethylene-α-olefin copolymer to be measured and a polyolefin was kneaded at a temperature of 160° C. by means of a plast mill for 5 minutes, and then hot-pressed to form a 0.3-mm thick sheet. Referring to the hot pressing conditions, the non-crosslinked specimen was processed clamped by aluminum sheets under the following conditions:

1) The specimen was pre-heated to a temperature of 140° C. for 5 minutes;
2) The specimen was pressed to a temperature of 140° C. under a pressure of 100 kg/cm$^2$ for 5 minutes;
3) The specimen was cooled down to 30° C. from 140° C. under pressure in 5 minutes.

If the specimen was crosslinked, it was previously kneaded with 2 parts by weight of dicumyl peroxide at a temperature of 120° C. The specimen was then processed clamped by teflon sheets under the following conditions:

1) The specimen was pre-heated to a temperature of 120° C. for 5 minutes;
2) The specimen was pressed at a temperature of 120° C. under a pressure of 100 kg/cm$^2$ for 5 minutes;
3) The specimen was cooled down to 30° C. from 120° C. under pressure in 5 minutes (Specimens having voids are excluded);
4) The specimen was again pre-heated to a temperature of 120° C. for 5 minutes;
5) The specimen was pressed at a temperature of 120° C. under a pressure of 100 kg/cm$^2$ for 5 minutes;
6) The specimen was heated from 120° C. to 160° C. under pressure;
7) The specimen was crosslinked at a temperature of 160° C. under pressure for 30 minutes;
8) The specimen was cooled down to 30° C. from 160° C. under pressure in 5 minutes.

2. Measurement of volume resistance

Figure 3A:
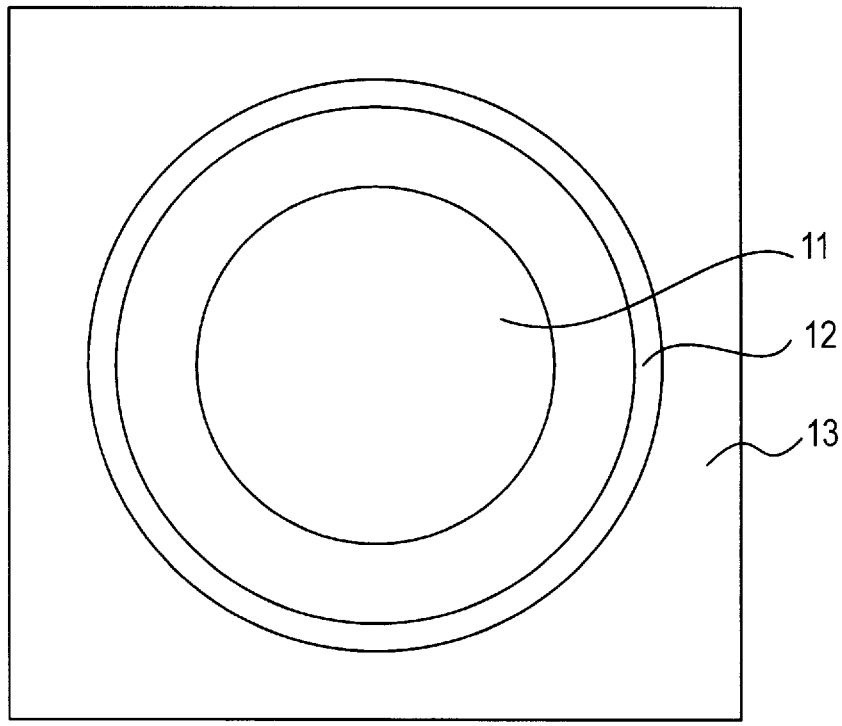
FIGS. 3(a) and 3(b) are illustrations of an electrode system.
Figure 3B:
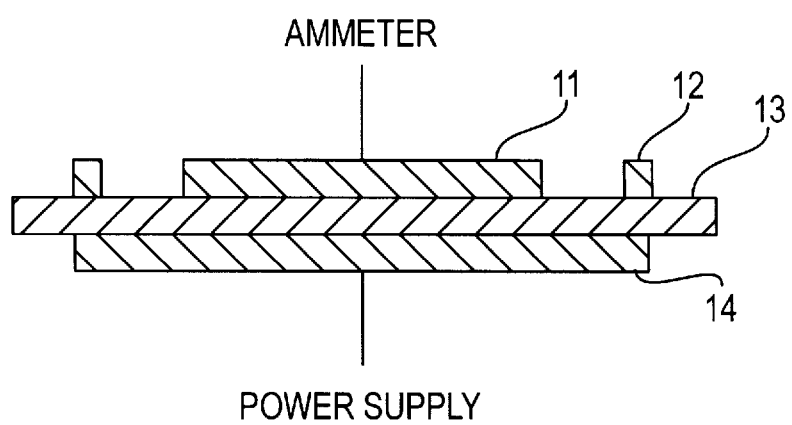

The electrode system shown in FIGS. 3(a) and 3(b) was used. FIG. 3(a) is a plan view of the electrode system. FIG. 3(b) is a side view of the electrode system. In FIGS. 3(a) and 3(b), the reference numeral 11 indicates a main electrode (diameter: 50 mm), the reference numeral 12 indicates a guard electrode (inner diameter: 75 mm; outer diameter: 80 mm), the reference numeral 13 indicates the specimen, and the reference numeral 14 indicates a high voltage electrode (diameter: 80 mm). The main electrode was connected to a vibrating reed ammeter via a cable. The high voltage electrode was connected to a high voltage power supply via a cable. These electrodes were made of stainless steel plate. The surface of the electrodes which comes into contact with the specimen was mirror-polished by a buffing machine.

In the measurement of volume resistance, the specimen was set in the electrode system at room temperature and 90° in an atmosphere of nitrogen as shown in FIGS. 3(a) and 3(b). Current was allowed to pass through the specimen between the upper electrode and the lower electrode for 5 minutes. The electric charge thus developed on the surface of the specimen was then eliminated. Thereafter, the measurement was conducted at room temperature and 90° C. in an atmosphere of nitrogen. For those to be measured at 90° C., current was allowed to pass through the specimen for 7 minutes so that the specimen exhibited 90° C. uniformly thereinside.

The applied voltage was direct current having a voltage of 3,300 V from a battery. As the measuring instrument there is used a vibrating reed ammeter (TR8411, available from Advantest Co., Ltd.). The measuring instrument and the electrode were connected to each other via a pipe cable to eliminate external noises. In this measurement system, stable measurement could be made up to $3 \times 10^{17}$ Ω' at room temperature and $2 \times 10^{16}$ Ω at a temperature of 90° C. The thickness of the specimen was about 0.3 mm. Reading was conducted down to two places of decimals. The effective electrode area was 19.6 cm$^2$. The survey of the current-time characteristics showed that stable measurement of electric current free from current drop due to absorption of current could not be made before 10 minutes after the application of voltage. Accordingly, the current value developed 10 minutes after the application of voltage was employed as a measured value. However, if the current did not become stable even after 10 minutes of voltage application, about 2 more minutes were passed to stabilize the current so that stable measurement was made possible. However, if further time was required to stabilize the current, measurement was omitted. From these measurements of current, the volume resistance of the specimen was determined. The measurement was conducted 10 times. The resulting measurements were then averaged.

The specimens A16 to A24 used in Examples 21 to 29 were prepared by the following polymerization methods:

Preparation of solid catalyst C1

150 ml of purified toluene was charged into a 500-ml eggplant type flask equipped with an electromagnetically-induced agitator in an atmosphere of nitrogen. 2.6 g of tetrapropoxy zirconium (Zr(On-Pr)$_4$) and 1.3 g of methylcyclopentadiene were then charged into the flask. The reaction mixture was then stirred at room temperature for 30 minutes. 3.2 g of triisobutyl aluminum (Al(iBu)$_3$) was then added dropwise to the system while the system was being kept at a temperature of 0° C. After the completion of dropwise addition, the reaction system was returned to room temperature where it was then stirred for 16 hours. To the solution was then added 200 ml of a toluene solution of methyl alumoxane (concentration: 1 mmol/ml). The reaction mixture was then allowed to undergo reaction at room temperature for 1 hour.

Separately, 50 g of silica (available from Fuji Davison Co., Ltd.; grade: #952; surface area: 300 m$^2$/g) which had been previously calcined at a temperature of 600° C. for 5 hours was charged into a 1.5-l three-necked flask with an agitator in an atmosphere of nitrogen. Into the flask was then poured the total amount of the foregoing solution. The reaction mixture was then stirred at room temperature for 2 hours. Nitrogen was then blown through the reaction system to remove the solvent therefrom. As a result, a solid powdered catalyst C1 having a good fluidity was obtained.

Preparation of specimen A16

Ethylene and 1-butene were copolymerized at a polymerization temperature of 70° C. and a total pressure of 20 kgf/cm$^2$G by means of a continuous fluidized bed gas phase polymerization apparatus. The gas composition in the system had 1-butene/ethylene molar ratio of 0.10 and an ethylene concentration of 60 mol %. The polymerization process was effected with Catalyst C1 being continuously supplied. In order to keep the gas composition in the system constant, the various gases were continuously supplied into the system. The adjustment of MFR was accomplished by controlling the hydrogen concentration in the system. The physical properties of the polymer thus produced are set forth in Table 9.

Preparation of specimen A17

Polymerization was effected in the same manner as in A16 except that 1-butene/ethylene molar ratio was changed. The physical properties of the copolymer thus produced are set forth in Table 9.

Preparation of solid catalyst C2

Purified toluene was charged into a catalyst making apparatus equipped with an electromagnetically-induced agitator in an atmosphere of nitrogen. 0.55 g of dipropoxy dichloro zirconium (Zr(OPr)$_2$Cl$_2$) and 1.6 g of methylcyclopentadiene were then charged into the flask. 9.0 g of tridecyl aluminum was then added dropwise to the system while the system was being kept at a temperature of 0° C. After the completion of dropwise addition, the reaction system was stirred while the temperature thereof was being kept to 50° C. for 16 hours. To the solution was then added 200 ml of a toluene solution of methyl alumoxane (concentration: 1 mmol/ml). The reaction mixture was then allowed to undergo reaction at room temperature for 1 hour. Separately, purified toluene was charged into another catalyst making apparatus equipped with an agitator in an atmosphere of nitrogen. Subsequently, 50 g of silica (available from Fuji Davison Co., Ltd.; grade: #952; surface area: 300 m$^2$/g) which had been previously calcined at a temperature of 400° C. for a predetermined period of time was charged into the apparatus. To the reaction mixture was then added the total amount of the solution. The reaction mixture was then stirred at room temperature. Nitrogen was then blown through the reaction mixture to remove the solvent therefrom. As a result, a solid powdered catalyst (C2) having a good fluidity was obtained.

Preparation of specimen A18

Ethylene and 1-butene were copolymerized at a polymerization temperature of 70° C. and a total pressure of 20 kgf/cm$^2$G by means of a continuous fluidized bed gas phase polymerization apparatus. The gas composition in the system had 1-butene/ethylene molar ratio of 0.10 and an ethylene concentration of 60 mol %. The polymerization process was effected with Catalyst C2 being continuously supplied. In order to keep the gas composition in the system constant, the various gases were continuously supplied into the system. The adjustment of MFR was accomplished by controlling the hydrogen concentration in the system. The physical properties of the polymer thus produced are set forth in Table 9.

Preparation of specimen A19 and A20

The procedure of A16 was followed to prepare specimens A19 and A20 except that the comonomer to be polymerized was 1-hexene. The physical properties of the copolymers thus produced are set forth in Table 9.

Preparation of catalyst component C3

100 ml of purified toluene was charged into a 300-ml three-necked flask equipped with an electromagnetically-induced agitator in an atmosphere of nitrogen. 4.9 g of tetrakis(2,4-pentanedionate)zirconium (Zr(acac)$_4$) and 7.4 g of 1,3-dimethylcyclopentadiene were then charged into the flask. The reaction mixture was then stirred at room temperature for 30 minutes. To the reaction mixture was then added dropwise 20 ml of triisobutyl aluminum (Al(iBu)$_3$) at room temperature in 30 minutes. After the completion of dropwise addition, the reaction mixture was stirred at room temperature for 1 hour to undergo reaction. As a result, a solution C3 containing a catalyst component according to the present invention was obtained. The zirconium concentration of the solution C3 was 0.076 mmol/ml.

Preparation of specimen A21

The air in a 3-l stainless steel autoclave equipped with an agitator was replaced by nitrogen. Into the autoclave was then charged 200 g of dried sodium chloride. Into the autoclave were then charged 0.29 ml of the foregoing catalyst component solution C3 and 2.2 ml of a 1 mmol/ml methylaluminoxane solution. The reaction mixture was then heated to a temperature of 60° C. with stirring. Subsequently, a mixture of ethylene and 1-butene (1-butene/ethylene molar ratio: 0.25) was then charged into the autoclave at a pressure of 9 kg/cm$^2$G to initiate polymerization. The polymerization process lasted for 1 hour while the total pressure of the reaction system was being kept to 9 kg/cm$^2$G by continuously supplying a mixture of ethylene and 1-butene (1-butene/ethylene molar ratio: 0.05).

After the completion of polymerization, excess gas was discharged from the reactor. The reactor was then cooled. Sodium chloride was then removed from the reactor. As a result, 81 g of a white polymer was obtained. The catalytic efficiency was 40,000 g/gZr. The physical properties of the polymer thus produced are set forth in Table 9.

Preparation of catalyst component C4

50 ml of purified toluene was charged into a 100-ml three-necked flask equipped with an electromagnetically-induced agitator in an atmosphere of nitrogen. 4 g of tributoxymono(trimethylsilanolate)zirconium and 12 g of butylcyclopentadiene were then charged into the flask. The reaction mixture was then stirred at room temperature for 30 minutes. To the reaction mixture was then added dropwise 34 ml of trihexyl aluminum (Al(n-Hx)$_3$) at room temperature in 30 minutes. After the completion of dropwise addition, the reaction mixture was stirred at room temperature for 1 hour to undergo reaction. As a result, a solution C4 containing a catalyst component according to the present invention was obtained. The zirconium concentration of the solution C4 was 0.101 mmol/ml.

Preparation of specimen A22

0.11 ml (1 mg as calculated in terms of Zr) of the foregoing catalyst component solution C4 and 1 ml of a 1 mmol/ml methylaluminoxane solution were charged into a 50-ml flask with stirring in an atmosphere of nitrogen.

The air in a 3-l stainless steel autoclave equipped with an agitator was replaced by nitrogen. Into the autoclave was then charged 200 g of dried sodium chloride. Into the autoclave were then charged the total amount of the foregoing catalyst component solution. The reaction mixture was then heated to a temperature of 60° C. with stirring. Subsequently, a mixture of ethylene and 1-butene (1-butene/ethylene molar ratio: 0.25) was then charged into the autoclave at a pressure of 9 kg/cm$^2$G to initiate polymerization. The polymerization process lasted for 1 hour while the total pressure of the reaction system was being kept to 9 kg/cm$^2$G by continuously supplying a mixture of ethylene and 1-butene (1-butene/ethylene molar ratio: 0.05).

After the completion of polymerization, excess gas was discharged from the reactor. The reactor was then cooled. Sodium chloride was then removed from the reactor. As a result, 190 g of a white polymer was obtained. The catalytic efficiency was 190,000 g/gZr. The physical properties of the polymer thus produced are set forth in Table 9.

Preparation of catalyst component C5

150 ml of purified toluene was charged into a 300-ml three-necked flask equipped with an electromagnetically-induced agitator in an atmosphere of nitrogen. 3.9 g of tetrabutoxy zirconium and 6.4 g of methylcyclopentadiene were then charged into the flask. The reaction mixture was then stirred at room temperature for 30 minutes. The reaction mixture was cooled to and kept at a temperature of 0° C. where 27.5 ml of trihexyl aluminum (Al(n-Hx)$_3$) was then added dropwise thereto in 30 minutes. After the completion of dropwise addition, the reaction mixture was stirred at room temperature for 24 hours. Into a 3-ml flask the air in which had been replaced by nitrogen were then charged 3 ml (0.2 mmol as calculated in terms of Zr) of the foregoing solution and 4 ml of a 1 mmol/ml methylaluminoxane. The reaction mixture was then stirred at room temperature for 30 minutes. To the reaction mixture was then added 0.16 g (0.2 mmol) of N,N-dimethylaniliumtetrakis (pentafluorophenyl)borate. The reaction mixture was then stirred at room temperature for 3 hours. As a result, a solution C5 containing a catalyst component according to the present invention was obtained.

Preparation of specimen A23

The air in a 3-l stainless steel autoclave equipped with an agitator was replaced by nitrogen. Into the autoclave was then charged 1,000 g of purified toluene. Into the autoclave were then charged 0.2 ml (0.5 mg as calculated in terms of Zr) of the foregoing catalyst component solution C5. The reaction mixture was then heated to a temperature of 60° C. with stirring. Subsequently, a mixture of ethylene and 1-butene (1-butene/ethylene molar ratio: 0.25) was then charged into the autoclave at a pressure of 9 kg/cm$^2$G to initiate polymerization. The polymerization process lasted for 1 hour while the total pressure of the reaction system was being kept to 9 kg/cm$^2$G by continuously supplying a mixture of ethylene and 1-butene (1-butene/ethylene molar ratio: 0.05).

After the completion of polymerization, excess gas was discharged from the reactor. The reactor was then cooled. The contents of the autoclave were then withdrawn from the reactor. As a result, 72 g of a white polymer was obtained. The catalytic efficiency was 36,000 g/gZr. The physical properties of the polymer thus produced are set forth in Table 9.

Preparation of catalyst component C6

150 ml of purified toluene was charged into a 300-ml three-necked flask equipped with an electromagnetically-induced agitator in an atmosphere of nitrogen. 3.9 g of tetrabutoxy zirconium and 11 g of cyclopentadiene trimethyl silane were then charged into the flask. The reaction mixture was then stirred at room temperature for 30 minutes. The reaction mixture was cooled to and kept at a temperature of 0° C. where 9.1 g of triethyl aluminum was then added dropwise thereto in 30 minutes. After the completion of dropwise addition, the reaction mixture was stirred at room temperature for 24 hours. Into a 50-ml flask the air in which had been replaced by nitrogen were then charged 3.4 ml (0.2 mmol as calculated in terms of Zr) of the foregoing solution and 4 ml of a 1 mmol/ml methylaluminoxane. The reaction mixture was then stirred at room temperature for 30 minutes. To the reaction mixture was then added 0.16 g (0.2 mmol) of N,N-dimethylaniliumtetrakis (pentafluorophenyl)borate. The reaction mixture was then stirred at room temperature for 3 hours. As a result, a solution C6 containing a catalyst component according to the present invention was obtained.

Preparation of specimen A24

The procedure of Example 23 was followed to effect polymerization reaction except that the foregoing catalyst component C6 was added in an amount of 0.19 ml. The catalyst efficiency was 150,000 g/gZr. The physical properties of the polymer thus produced are set forth in Table 9.

Specimen (B7) was obtained by the gas phase process copolymerization of ethylene and 1-butene in the presence of titanium tetrachloride and triethyl aluminum catalyst. The physical properties of Specimen (B7) are set forth in Table 10 together with the results of evaluation.

Specimen (B8) was an ethylene-1-butene copolymer (LLDPE) obtained by the slurry process copolymerization of ethylene and 1-butene in the presence of titanium tetrachloride and triethyl aluminum catalyst. The physical properties of Specimen (B8) are set forth in Table 10 together with the results of evaluation.

Specimen (B9) was an ethylene-1-hexene copolymer (LLDPE) obtained by the gas phase copolymerization of ethylene and 1-hexene in the presence of titanium tetrachloride and triethyl aluminum catalyst. The physical properties of Specimen (B9) are set forth in Table 10 together with the results of evaluation.

Preparation of specimen B10

25 l of purified toluene was charged into a 50 l pressure reactor with an agitator the air in which had been replaced by nitrogen. Into the autoclave was then charged 330 g of 1-butene. To the reaction mixture was then added a mixture of bis(n-butylcyclopentadienyl)zirconium dichloride and methylalumoxane (MAO) (Al/Zr molar ratio: 500) in such an amount that the amount of Zr reached 0.33 mmol. The reaction mixture was then heated to a temperature of 80° C. to prepare a metalocene catalyst. Subsequently, ethylene was charged into the reactor at a pressure of 9 kg/cm$^2$G to initiate polymerization. The polymerization process lasted for 1 hour while the total pressure of the reaction system was being kept to 6 kg/cm$^2$G by continuously supplying ethylene to prepare an ethylene-1-butene copolymer. The physical properties of the copolymer thus prepared are set forth in Table 10.

Results of evaluation

In Examples 21 and 22 according to the present invention, ethylene-1-butene copolymers were prepared from 1-butene as a comonomer in the presence of a chlorine-free catalyst. The results of evaluation show that these ethylene-1-butene copolymers are little apt to rusting and are excellent in impact strength, transparency and low temperature heat-seal properties. In Example 23, an ethylene-1-butene copolymer according to the present invention was prepared from 1-butene as a comonomer in the presence of a catalyst containing a halogen (chlorine). On the other hand, in Comparative Examples 12 and 13, ethylene-1-butene copolymers were prepared from 1-butene as a comonomer in the presence of a Ziegler catalyst containing the same halogen. These ethylene-1-butene copolymers cause much rust and exhibit poor impact strength, transparency and low temperature heat-seal properties.

In Examples 24 and 25, ethylene-1-hexene copolymers were prepared from 1-hexene as a comonomer in the presence of a chlorine-free catalyst. In Comparative Example 14, LLDPE was prepared from 1-hexene as a comonomer in the presence of a Ziegler catalyst. The comparison of these copolymers shows that LLDPE of Comparative Example 14 causes much rust and exhibits poor impact strength, transparency and low temperature heat-seal properties.

In Comparative Example 15, an ethylene-1-butene copolymer was prepared from 1-butene as a comonomer in the presence of the above-described catalyst. The ethylene-1-butene copolymer thus prepared causes much rust and disadvantageous in moldability as compared with Examples 21, 22 and 23.

In Examples 26 to 29 according to the present invention, an autoclave was used as a polymerization reactor. Ethylene-1-butene copolymers were prepared by bulk polymerization process from 1-butene as a comonomer in the presence of a preferred catalyst characteristic of the present invention. These ethylene-1-butene copolymers cause little rust and exhibit excellent impact strength, transparency and low temperature heat-seal properties. This proves that the physical properties of the polymers according to the present invention are excellent regardless of preparation process.

TABLE 9

| | Example | | | | | | | | |
|---|---|---|---|---|---|---|---|---|---|
| | 21 | 22 | 23 | 24 | 25 | 26 | 27 | 28 | 29 |
| Specimen | A16 | A17 | A18 | A19 | A20 | A21 | A22 | A23 | A24 |
| Polymerization process | gas | gas | gas | gas | gas | bulk | bulk | bulk | bulk |
| Catalyst | C1 | C1 | C2 | C1 | C1 | C3 | C4 | C5 | C6 |
| Density (g/cm$^3$) | 0.918 | 0.913 | 0.917 | 0.919 | 0.913 | 0.921 | 0.924 | 0.922 | 0.923 |
| MFR (g/10 min) | 2.5 | 2.3 | 2.4 | 2.1 | 2.3 | 2.1 | 1.6 | 1.6 | 0.8 |
| Comonomer | 1-butene | 1-butene | 1-butene | 1-hexene | 1-hexene | 1-butene | 1-butene | 1-butene | 1-butene |
| Mw/Mn | 2.8 | 3.1 | 2.7 | 2.9 | 3.4 | 3.1 | 3.3 | 3.0 | 2.8 |
| Cb | 1.15 | 1.18 | 1.21 | 1.33 | 1.38 | 1.22 | 1.32 | 1.21 | 1.20 |
| ODCB (wt %) | 0.9 | 1.8 | 1.2 | 2.2 | 3.5 | 0.8 | 0.6 | 1.0 | 0.9 |
| X (calculated) (wt %) | 4.3 | 5.9 | 4.5 | 3.8 | 5.9 | 3.3 | 2.6 | 2.9 | 2.4 |
| Maximum melting point Tm (°C.) | 118 | 116 | 117 | 120 | 118 | 115 | 115 | 117 | 114 |
| TREF peak | plural | plural | plural | plural | plural | plural | plural | plural | plural |
| Activation energy (eV) | 0.15 | 0.11 | 0.23 | 0.12 | 0.18 | 0.25 | 0.17 | 0.20 | 0.21 |

| | Example | | | | | | | | |
|---|---|---|---|---|---|---|---|---|---|
| | 21 | 22 | 23 | 24 | 25 | 26 | 27 | 28 | 29 |
| Tensile impact strength (kgfcm/cm$^2$) | 750 | 940 | 780 | 1,450 | 1,580 | 520 | 460 | 480 | 710 |
| Tensile modulus (kg/cm$^2$) | 1,240 | 920 | 1,130 | 1,470 | 1,050 | 1,670 | 1,820 | 1,660 | 2,050 |
| Haze (%) | 2.9 | 2.1 | 3.1 | 5.2 | 4.5 | 3.2 | 3.5 | 3.1 | 3.6 |
| Gloss (%) | 125 | 130 | 120 | 112 | 116 | 120 | 116 | 118 | 116 |
| Low temperature heat-seal property (°C.) | 106 | 99 | 104 | 104 | 99 | 106 | 108 | 106 | 107 |
| Rust test (mg) | 1.8 | 2.1 | 2.6 | 1.7 | 1.6 | 2.0 | 1.9 | 2.2 | 2.0 |
| Volume resistance 90° C. (Ωcm) | $2.8 \times 10^{18}$ | $2.3 \times 10^{18}$ | $1.1 \times 10^{18}$ | $3.0 \times 10^{18}$ | $2.0 \times 10^{18}$ | $2.5 \times 10^{18}$ | $2.0 \times 10^{18}$ | $1.2 \times 10^{18}$ | $2.6 \times 10^{18}$ |

TABLE 10

| | Comparative Example | | | |
|---|---|---|---|---|
| | 12 | 13 | 14 | 15 |
| Specimen | B7 | B8 | B9 | B10 |
| Polymerization process | gas | slurry | gas | slurry |
| Catalyst | Ziegler | Ziegler | Ziegler | metallocene |
| Density (g/cm$^3$) | 0.921 | 0.921 | 0.922 | 0.912 |
| MFR (g/10 min) | 2.0 | 1.7 | 1.7 | 1.5 |
| Comonomer | 1-butene | 1-butene | 1-hexene | 1-butene |
| Mw/Mn | 4.8 | 5.1 | 5.2 | 2.3 |
| Cb | 1.60 | 1.71 | 2.24 | 1.05 |
| ODCB (wt %) | 3.7 | 4.8 | 5.9 | 0.7 |
| X (calculated) (wt %) | 3.3 | 3.2 | 2.9 | 5.7 |
| Maximum melting point Tm (°C.) | 123 | 124 | 125 | 113 |
| TREF peak | plural | plural | plural | single |
| Activation energy (eV) | 0.42 | 0.80 | 0.54 | 0.35 |
| Tensile impact strength (kgfcm/cm$^2$) | 250 | 310 | 790 | 900 |
| Tensile modulus (kg/cm$^2$) | 1,750 | 1,640 | 2,230 | 980 |
| Haze (%) | 5.6 | 4.5 | 9.8 | 3.1 |
| Gloss (%) | 112 | 108 | 95 | 125 |
| Low temperature heat-seal property (°C.) | 120 | 121 | 121 | 103 |
| Rust test (mg) | 8.3 | 7.5 | 11.0 | 4.8 |
| Volume resistance 90° C. (Ωcm) | $2.9 \times 10^{15}$ | $3.0 \times 10^{15}$ | $2.5 \times 10^{15}$ | $8.0 \times 10^{15}$ |

The testing methods used in Examples 30 to 45 and Comparative Examples 16 and 17 will be described hereinafter.
Physical properties test
All the tests were conducted in the same manner as in Examples 1 to 10 and Comparative Examples 1 to 8.
T-die film molding conditions
Make of apparatus used: Union Plastic Co., Ltd.
Extruder screw diameter: 30 mm
T-die: 300 mm face
Number of revolutions of screw: 50 rpm
Extrusion rate: 4.8 kg/hr
Die lip gap: 1.2 mm
Take-off speed: 6.1 to 6.3 m/min
Molded resin temperature: 210° to 240° C.
Film thickness: 50 μm
Chill-roll temperature: 40° C.
Screen mesh: 80 mesh/120 mesh/80 mesh
Corona treatment: approx. 45 dyne/cm
Dry lamination conditions Base: Biaxially-stretched nylon film (thickness: 15 μm)
Laminating machine: Test Coater MGC-180, available from Labo Co., Ltd.
Anchor coat agent: Polyether anchor coat agent 308 A/B (mixing ratio: 1/1), available from Toyo Morton Co., Ltd.
Laminated face: Corona-treated
Ageing: 40° C. for 2 days after laminated
T-die molded film evaluation method
Tensile impact strength:
Measured in accordance with ASTM D1822
Low temperature heat-seal properties:
Using a heat-sealer available from Tester Sangyo Co., Ltd., the specimen was heat-sealed at a pressure of 2 kg/cm$^2$G for 1 second at some properly selected temperatures. This film was then cut into a 15-mm wide web. The web specimen was then subjected to peel test at a peeling rate of 300 mm/min. The low temperature heat-seal properties were represented by the temperature value at which the peel strength of the specimen was 500 g, determined by interpolation. The lower this temperature value was, the better were the low temperature heat-seal properties.
Haze:
Measured by means of a direct-reading haze computer HGH-2DP available from Suga Shikenki K. K. in accordance with JIS K7105
Blocking strength:
Two sheets of film were stacked opposed to each other. The stack was then conditioned under a load of 5 kg/10cm$^2$ at a temperature of 50° C. for 2 hours. The specimen was then pulled at a tensile speed of 500 mm/min by means of a tensile tester available from Toyo Seiki K. K. at a temperature of 23° C. and 50%RH. The force required for shearing peel was measured.
Laminated film evaluation method
Blocking strength:
Two sheets of laminated films were stacked in such a manner that the sealant face of the two sheets were opposed to each other. The stack was then conditioned under a load of 10 kg/25cm$^2$ at a temperature of 40° C. for 5 days. The specimen was then pulled at a tensile speed of 100 mm/min by means of a tensile tester available from Toyo Seiki K. K. at a temperature of 23° C. and 50%RH. The force required for shearing peel was then measured.
Lubricating property:
Using a static friction coefficient measuring instrument available from Shinto Kagaku Co., Ltd., the lubricating property of sealant face with each other was measured over a width of 35 mm and a length of 75 mm under a load of 200 g. The angle of slip θ was measured at a gradient rise rate of 1.7°/sec. The lubricating property was represented in tanθ. The smaller this value was, the better was the lubricating property.
Adhesiveness:
The laminated film was heat-sealed by a 5-mm seal bar of a heat sealer available from Tester Sangyo Co., Ltd. at a temperature of 140° C. and a pressure of 2 kg/cm$^2$ for 1 second in such a manner that the sealant faces were sealed to each other. The film thus heat-sealed was then cut into a 15-mm wide web specimen. The specimen was then measured for tensile strength at a tensile rate of 300 mm/min. The tensile strength of a biaxially-stretched nylon film was very greater than that of a film made of polyethylene alone. Thus, the tensile strength of the heat-sealed area of the laminated film was related to the adhesiveness of the heat-sealed area that reflected the tensile characteristics of nylon. In other words, a heat-sealed area having a good adhesiveness exhibited a great tensile strength. If the heat-sealed area had an insufficient adhesiveness, it could only exhibit a strength inherent to polyethylene and hence a reduced tensile strength. When the heat-sealed area of the laminated film had a tensile strength of not less than 4.5 kg/15 mm width, the adhesiveness was considered good (A). When the heat-sealed area of the laminated film had a tensile strength of less than 4.5 kg/15 mm width, the adhesiveness was considered poor (C).

Specimens A25 to A29 were prepared by the following polymerization methods:
Preparation of solid catalyst
The procedure of Examples 1 to 10 was followed to obtain Catalyst C.
Preparation of specimen A25
Ethylene and 1-butene were copolymerized at a polymerization temperature of 70° C. and a total pressure of 20 kgf/cm$^2$G by means of a continuous fluidized bed gas phase polymerization apparatus. The polymerization process was effected with Catalyst C being continuously supplied. In order to keep the gas composition in the system constant, the various gases were continuously supplied into the system. The physical properties of the copolymer thus produced are set forth in Table 11.
Preparation of specimens A26 to A28
The procedure of A25 was followed to effect polymerization except that the 1-butene/ethylene molar ratio was changed. The physical properties of the copolymer thus obtained are set forth in Tables 11 and 12 together with the results of experiment.
Preparation of specimen A29
The procedure of A25 was followed to effect polymerization except that the comonomer to be copolymerized was 1-hexene. The physical properties of the copolymer thus obtained are set forth in Table 11 together with the results of experiment.
Other resins
B11:
Linear low density polyethylene prepared in the presence of a Ziegler catalyst (Slurry-polymerized from butene-1 as a comonomer in the presence of titanium tetrachloride and triethyl aluminum catalyst (density: 0.921 g/cm$^3$; MFR: 1.9 g/10 min))
B12:
Low density polyethylene obtained by high pressure radical polymerization (Density: 0.925 g/cm$^3$; MFR: 3.2 g/10 min. Lubricant EA: Amide erucate (trade name: Neutron S, available from Nihon Seika K. K.) EBOA: Amide ethylenebisoleate (trade name: Slipax O, available from Nippon Kasei Chemical Co., Ltd.)

EXAMPLE 30

Table 11 shows the results of evaluation of T-die films.

In Example 30, to 100 parts by weight of a resin component (A25) were added 0.24 parts by weight of Irganox 1076 (available from Ciba Geigy Inc.), 0.12 parts by weight of Irgaphos 168 (available from Ciba Geigy Inc.), 0.07 parts by weight of amide erucate (EA), 0.04 parts by weight of amide ethylenebisoleate (EBOA), 0.1 parts by weight of calcium stearate (available from NOF Corporation), and a natural silica (trade name: Celite Super Floss, available from Johns-manville Inc.). The mixture was homogeneously stirred by means of a Henschel mixer for about 30 seconds, and then pelletized. The pelletized material was then processed by a press to form a 0.5-mm thick sheet. The sheet was then subjected to tensile impact test (TIS). The pelletized material was then subjected to T-die molding under the foregoing conditions to obtain a 50-μm thick film (raw film). The film thus obtained was then measured for low temperature heat-seal properties, haze and blocking strength. The results are set forth in Table 11.

EXAMPLES 31 TO 37

T-die flat film were evaluated in the same manner as in Example 30. The resin components set forth in Table 11 were processed and tested in the same manner as in Example 30. The results of evaluation are set forth in Table 11.

COMPARATIVE EXAMPLE 16

A T-die flat film was evaluated in the same manner as in Example 30. The procedure of Example 30 was followed except that B11 was used as the resin component and 0.5 parts by weight of an anti-blocking agent was added as shown in Table 11. The results of evaluation are set forth in Table 11.

The film of Comparative Example 16 exhibited poor TIS and low temperature heat-seal properties and slightly poor haze and blocking resistance.

COMPARATIVE EXAMPLE 17

A T-die flat film was evaluated in the same manner as in Example 30. The procedure of Example 30 was followed except that B12 was used as the resin component. The results of evaluation are set forth in Table 11.

The film of Comparative Example 17 exhibited poor TIS and slightly poor haze.

EXAMPLE 38

Table 12 show the results of evaluation of laminated films.

In Example 38, a T-die flat film formed under the foregoing conditions was dry-laminated on a nylon film under the foregoing conditions. The T-die flat film was then measured for adhesiveness, lubricating property and blocking strength with respect to the laminating film. The results are set forth in Table 12.

EXAMPLES 39 TO 45

The resin components set forth in Table 12 were processed and tested in the same manner as in Example 38. The results are set forth in Table 12.

TABLE 11

| | Example | | | | | | | | Comparative Example | |
|---|---|---|---|---|---|---|---|---|---|---|
| | 30 | 31 | 32 | 33 | 34 | 35 | 36 | 37 | 16 | 17 |
| Resin | | | | | | | | | | |
| Kind | A25 | A26 | A27 | A28 | A29 | A25 | A25 | A25 | B11 | B12 |
| MFR (g/10 min) | 2.0 | 1,5 | 4.4 | 4.7 | 3.4 | 2.0 | 2.0 | 2.0 | 1.9 | 3.0 |
| Density (g/cm$^3$) | 0.919 | 0.914 | 0.919 | 0.912 | 0.912 | 0.919 | 0.919 | 0.919 | 0.921 | 0.925 |
| Mw/Mn | 2.6 | 2.6 | 2.5 | 2.5 | 2.7 | 2.6 | 2.6 | 2.6 | 4.7 | 6.7 |
| Cb | 1.21 | 1.18 | 1.22 | 1.14 | 1.20 | 1.21 | 1.21 | 1.21 | 1.51 | 1.03 |
| ODCB (wt %) | 0.8 | 2.0 | 1.2 | 3.2 | 3.5 | 0.8 | 0.8 | 0.8 | 4.5 | 1.4 |
| X (calculated) (wt %) | 3.7 | 5.0 | 4.6 | 7.2 | 6.7 | 3.7 | 3.7 | 3.7 | 3.2 | 2.8 |
| Ratio (wt %) | 100 | 100 | 100 | 100 | 100 | 80 | 80 | 30 | 100 | 100 |
| Kind | — | — | — | — | — | B11 | B12 | B11 | — | — |
| MFR (g/10 min) | — | — | — | — | — | 1.9 | 3.2 | 1.9 | — | — |
| Density (g/cm$^3$) | — | — | — | — | — | 0.921 | 0.925 | 0.921 | — | — |
| Ratio (wt %) | — | — | — | — | — | 20 | 20 | 70 | — | — |
| Lubricating agent | | | | | | | | | | |
| Kind | EA | EA | EA | EA | EA | EA | EA | EA | EA | EA |
| amount (part by weight) | 0.07 | 0.07 | 0.07 | 0.07 | 0.07 | 0.07 | 0.07 | 0.07 | 0.07 | 0.07 |
| Kind | EBOA | EBOA | EBOA | EBOA | EBOA | EBOA | EBOA | EBOA | EBOA | EBOA |
| amount (part by weight) | 0.04 | 0.04 | 0.04 | 0.04 | 0.04 | 0.04 | 0.04 | 0.04 | 0.04 | 0.04 |
| Total amount (part by weight) | 0.11 | 0.11 | 0.11 | 0.11 | 0.11 | 0.11 | 0.11 | 0.11 | 0.11 | 0.11 |
| Antiblocking agent (part by weight) | 0.25 | 0.25 | 0.25 | 0.25 | 0.25 | 0.25 | 0.25 | 0.25 | 0.5 | 0.25 |
| Tensile impact strength (kgfcm/cm$^2$) | 705 | 794 | 314 | 574 | 1,690 | 620 | 610 | 408 | 280 | 230 |
| Low temperature heat-seal property (°C.) | 108 | 98 | 109 | 103 | 103 | 110 | 109 | 112 | 122 | 107 |
| Haze (%) | 3.6 | 3.5 | 3.8 | 3.4 | 3.7 | 4.0 | 3.7 | 5.0 | 5.6 | 5.6 |
| Blocking strength (kgf/10 cm$^2$) | 0.8 | 0.8 | 0.8 | 0.9 | 0.9 | 0.9 | 0.8 | 1.0 | 1.3 | 0.9 |

TABLE 12

| | Example | | | | | | | |
|---|---|---|---|---|---|---|---|---|
| | 38 | 39 | 40 | 41 | 42 | 43 | 44 | 45 |
| Resin | | | | | | | | |
| Kind | A25 | A26 | A27 | A28 | A29 | A25 | A25 | A25 |
| MFR (g/10 min) | 2.0 | 1.5 | 4.4 | 4.7 | 3.4 | 2.0 | 2.0 | 2.0 |
| Density (g/cm$^3$) | 0.919 | 0.914 | 0.919 | 0.912 | 0.912 | 0.919 | 0.919 | 0.919 |
| Mw/Mn | 2.6 | 2.6 | 2.5 | 2.5 | 2.7 | 2.6 | 2.6 | 2.6 |
| Cb | 1.21 | 1.18 | 1.22 | 1.14 | 1.20 | 1.21 | 1.21 | 1.21 |
| ODCB (wt %) | 0.8 | 2.0 | 1.2 | 3.2 | 3.5 | 0.8 | 0.8 | 0.8 |
| X (calculated) (wt %) | 3.7 | 5.0 | 4.6 | 7.2 | 6.7 | 3.7 | 3.7 | 3.7 |
| Ratio (wt %) | 100 | 100 | 100 | 100 | 100 | 80 | 80 | 30 |
| Kind | — | — | — | — | — | B11 | B12 | B11 |
| MFR (g/10 min) | — | — | — | — | — | 1.9 | 3.2 | 1.9 |
| Density (g/cm$^3$) | — | — | — | — | — | 0.921 | 0.925 | 0.921 |
| Ratio (wt %) | — | — | — | — | — | 20 | 20 | 70 |
| Lubricating agent | | | | | | | | |
| Kind | EA | EA | EA | EA | EA | EA | EA | EA |
| amount (part by weight) | 0.07 | 0.07 | 0.07 | 0.07 | 0.07 | 0.07 | 0.07 | 0.07 |
| Kind | EBOA | EBOA | EBOA | EBOA | EBOA | EBOA | EBOA | EBOA |
| amount (part by weight) | 0.07 | 0.07 | 0.07 | 0.07 | 0.07 | 0.07 | 0.07 | 0.07 |
| Total amount (part by weight) | 0.11 | 0.11 | 0.11 | 0.11 | 0.11 | 0.11 | 0.11 | 0.11 |
| Antiblocking agent (part by weight) | 0.25 | 0.25 | 0.25 | 0.25 | 0.25 | 0.25 | 0.25 | 0.25 |
| Lubricating property (tan θ) | 0.18 | 0.20 | 0.26 | 0.10 | 0.28 | 0.21 | 0.28 | 0.20 |
| Adhesive property | A | A | A | A | A | A | A | A |
| Blocking strength (kgf/25 cm$^2$) | 1.6 | 1.8 | 1.5 | 1.6 | 1.7 | 1.8 | 1.7 | 2.0 |

The testing methods used in Examples 46 to 59 and Comparative Examples 18 to 21 will be described hereinafter.

Measurement of volume resistance

The volume resistance was measured in the same manner as in Examples 21 to 29 and Comparative Examples 12 to 15.

The specimens A30 to A32 used in Examples 46 to 48 were prepared by the following polymerization methods:

Preparation of specimen A30

(1) Preparation of catalyst 150 ml of purified toluene was charged into a 500-ml eggplant type flask equipped with an electromagnetically-induced agitator in an atmosphere of nitrogen. 0.60 g of tetrapropoxy zirconium (Zr(On-Pr)$_4$) and 1.0 g of indene were then charged into the flask. The reaction mixture was then stirred at room temperature for 30 minutes. 3.2 g of triisobutyl aluminum (Al(iBu)$_3$) was then added dropwise to the system while the system was being kept at a temperature of 0° C. in 30 minutes. After the completion of dropwise addition, the reaction system was returned to room temperature where it was then stirred for 24 hours. To the solution was then added 200 ml of a toluene solution of methyl alumoxane (concentration: 1 mmol/ml). The reaction mixture was then allowed to undergo reaction at room temperature for 1 hour.

Separately, 50 g of silica (available from Fuji Davison Co., Ltd.; grade: #952; surface area: 300 m$^2$/g) which had been previously calcined at a temperature of 600° C. for 5 hours was charged into a 1.5-l three-necked flask with an agitator in an atmosphere of nitrogen. Into the flask was then poured the total amount of the foregoing solution. The reaction mixture was then stirred at room temperature for 2 hours. Nitrogen was then blown through the reaction system to remove the solvent therefrom. As a result, a powder having a good fluidity was obtained.

(2) Polymerization

Ethylene and 1-butene were copolymerized at a polymerization temperature of 70° C. and a total pressure of 20 kgf/cm$^2$G by means of a continuous fluidized bed gas phase polymerization apparatus. The gas composition in the system had 1-butene/ethylene molar ratio of 0.08 and an ethylene concentration of 60 mol %. The polymerization process was effected with the foregoing catalyst being continuously supplied. In order to keep the gas composition in the system constant, the various gases were continuously supplied into the system. The adjustment of MFR was accomplished by controlling the hydrogen concentration in the system. The physical properties of the polymer thus produced are set forth in Table 13.

Preparation of specimen A31

Polymerization was effected in the same manner as in A30 except that the comonomer to be polymerized was 1-hexene. The physical properties of the copolymer thus produced are set forth in Table 13.

Preparation of specimen A32

(1) Preparation of catalyst 150 ml of purified toluene was charged into a catalyst making apparatus equipped with an electromagnetically-induced agitator in an atmosphere of nitrogen. 0.50 g of dipropoxy dichloro zirconium (Zr(OPr)$_2$Cl$_2$) and 1.0 g of methylcyclopentadiene were then charged into the flask. 9.0 g of tridecyl aluminum was then added dropwise to the system while the system was being kept at a temperature of 0° C. After the completion of dropwise addition, the reaction system was stirred while the temperature thereof was being kept to 50° C. for 16 hours. To the solution was then added 200 ml of a toluene solution of methyl alumoxane (concentration: 1 mmol/ml). The reaction mixture was then allowed to undergo reaction at room temperature for 1 hour.

Separately, purified toluene was charged into another catalyst making apparatus equipped with an agitator in an atmosphere of nitrogen. Subsequently, 50 g of silica (available from Fuji Davison Co., Ltd.; grade: #952; surface area: 300 m$^2$/g) which had been previously calcined at a temperature of 400° C. for a predetermined period of time was charged into the apparatus. To the reaction mixture was then added the total amount of the solution. The reaction mixture was then stirred at room temperature. Nitrogen was then blown through the reaction mixture to remove the solvent therefrom. As a result, a solid powdered catalyst having a good fluidity was obtained.

(2) Polymerization

Polymerization was effected under the same conditions as A30. The physical properties of the copolymer thus produced are set forth in Table 13.

Specimen B13 (Linear low density polyethylene prepared in the presence of a Ziegler catalyst)

This polyethylene was obtained by the copolymerization of ethylene and 1-butene in the presence of titanium tetrachloride and triethyl aluminum catalyst. (Density: 0.923 g/cm$^3$; MFR: 3.0 g/10 min)

Specimen B14 (Low density polyethylene prepared by high pressure radical polymerization process)

Trade name: Nisseki Rexron W2000, available from Nippon Petrochemical Industries, Ltd.; density: 0.919 g/cm$^3$; MFR: 1.0 g/10 min.

The other physical properties of the foregoing specimens are set forth in Table 13.

EXAMPLES 46 TO 48

Table 14 shows the comparison of the volume resistance and activation energy of non-crosslinked specimens. Examples 46 to 48 show the measurements of specimens A30 to A32, respectively.

COMPARATIVE EXAMPLE 18

Comparative Example 18 show the measurements of the linear low density polyethylene (specimen B13) prepared in the presence of a Ziegler catalyst. The measurements are set forth in Table 14. The linear low density polyethylene (specimen B13) exhibited a high activation energy and therefore a great temperature dependence. In particular, it exhibited a low volume resistance at a temperature of 90° C.

COMPARATIVE EXAMPLE 19

Comparative Example 19 show the measurements of the low density polyethylene (specimen B14) prepared by high pressure radical polymerization process. The measurements are set forth in Table 14. The low density polyethylene (specimen B14) exhibited a low volume resistance, a high activation energy and a great temperature dependence.

EXAMPLES 49 TO 56

Table 15 shows the measurements of volume resistance of an non-crosslinked mixture of specimen A30 and specimen (B14). Table 15 also shows the comparison of Example 46 with Comparative Example 19.

EXAMPLES 57 AND 58

Table 16 shows the measurements of volume resistance of a mixture of 10% by weight of specimen A31 (Example 57) or specimen A32 (Example 58) and 90% by weight of specimen B14.

COMPARATIVE EXAMPLE 20

Comparative Example 20 is a mixture of 10% by weight of specimen B13 and 90% by weight of specimen B14. The properties of the mixture are set forth in Table 16. The mixture exhibited a low volume resistance.

EXAMPLE 59

Table 17 shows the measurements of a crosslinked specimen. This crosslinked specimen was obtained by crosslinking the specimen of Example 55 (mixture of 10% by weight of specimen A30 and 90% by weight of specimen B14) under the foregoing conditions.

COMPARATIVE EXAMPLE 21

Comparative Example 21 shows the measurements of volume resistance of the crosslinked product of the specimen of Comparative Example 19. As shown in Table 17, the crosslinked product exhibited a low volume resistance.

Figure 4:
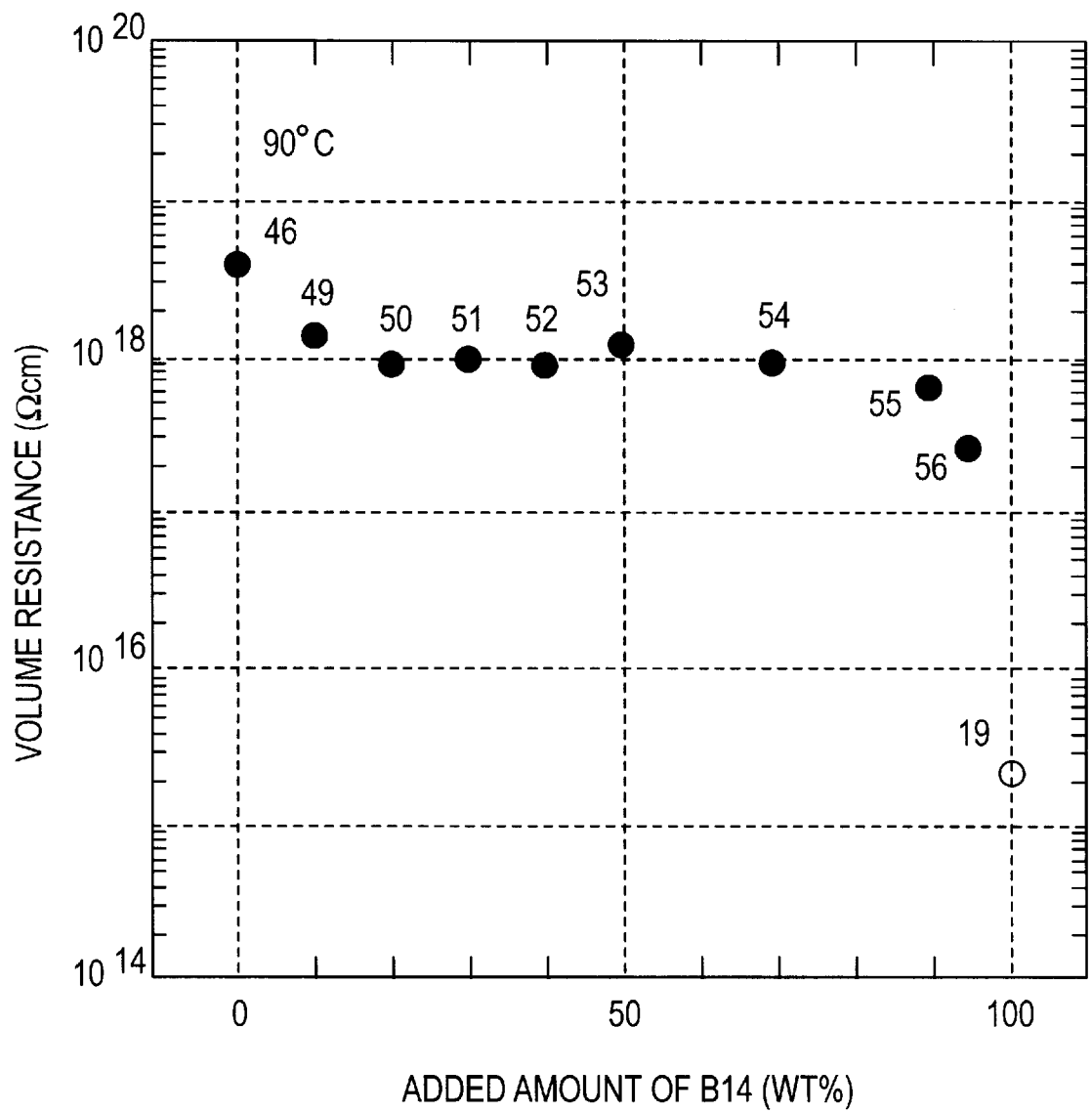
FIG. 4 is a graph illustrating the results of examples and comparative examples set forth in Table 15.

FIG. 4 is a graph illustrating the results of the examples and comparative examples set forth in Table 15. In FIG. 4, numerals 46 and 49 to 56 indicate the results of Examples 46 and 49 to 56, respectively, and numeral 19 indicates the result of Comparative Example 19.

TABLE 13

| Specimen | Comonomer | Density (g/cm$^3$) | MFR (g/10 min) | Mw/Mn | Cb | ODCB (wt %) | X (calculated) (wt %) | TREF peaks |
|---|---|---|---|---|---|---|---|---|
| A30 | C4 | 0.921 | 1.9 | 3.4 | 1.26 | 0.90 | 3.24 | plural |
| A31 | C6 | 0.920 | 1.9 | 2.4 | 1.34 | 0.51 | 3.47 | plural |
| A32 | C4 | 0.917 | 1.9 | 2.5 | 1.22 | 2.00 | 4.27 | plural |
| B13 | C4 | 0.923 | 3.0 | 3.7 | 1.50 | 5.00 | 3.15 | plural |
| B14 | — | 0.919 | 1.0 | — | — | — | — | — |

TABLE 14

| | Specimen (non-crosslinked) | Volume resistance (room temperature) (Ωcm) | Volume resistance (90° C.) (Ωcm) | Activation energy (eV) |
|---|---|---|---|---|
| Example 46 | A30 | 9.8 × 10$^{18}$ | 4.1 × 10$^{18}$ | 0.11 |
| Example 47 | A31 | 3.8 × 10$^{18}$ | 1.5 × 10$^{18}$ | 0.12 |
| Example 48 | A32 | 2.9 × 10$^{18}$ | 1.1 × 10$^{18}$ | 0.13 |
| Comparative Example 18 | B13 | 1.4 × 10$^{18}$ | 3.0 × 10$^{15}$ | 0.80 |
| Comparative Example 19 | B14 | 2.0 × 10$^{17}$ | 1.9 × 10$^{15}$ | 0.61 |

TABLE 15

| | Specimen<br>A30/B14<br>(wt %/wt %) | Volume resistance<br>(room temperature)<br>($\Omega$cm) | Volume resistance<br>(90° C.)<br>($\Omega$cm) |
| --- | --- | --- | --- |
| Example 49 | 90/10 | $9.8 \times 10^{18}$ | $1.4 \times 10^{18}$ |
| Example 50 | 80/20 | $9.8 \times 10^{18}$ | $8.9 \times 10^{17}$ |
| Example 51 | 70/30 | $9.8 \times 10^{18}$ | $9.3 \times 10^{17}$ |
| Example 52 | 60/40 | $9.8 \times 10^{18}$ | $8.7 \times 10^{17}$ |
| Example 53 | 50/50 | $9.8 \times 10^{18}$ | $1.2 \times 10^{18}$ |
| Example 54 | 30/70 | $9.8 \times 10^{18}$ | $9.3 \times 10^{17}$ |
| Example 55 | 10/90 | $9.9 \times 10^{18}$ | $6.1 \times 10^{17}$ |
| Example 56 | 5/95 | $6.8 \times 10^{18}$ | $2.5 \times 10^{17}$ |
| Example 46 | 100/0 | $9.8 \times 10^{18}$ | $4.1 \times 10^{18}$ |
| Comparative Example 19 | 0/100 | $2.0 \times 10^{17}$ | $1.9 \times 10^{15}$ |

TABLE 16

| | Specimen<br>(10 wt %/<br>90 wt %) | Volume resistance<br>(room temperature)<br>($\Omega$cm) | Volume resistance<br>(90° C.)<br>($\Omega$cm) |
| --- | --- | --- | --- |
| Example 57 | A31/B14 | $1.8 \times 10^{18}$ | $1.0 \times 10^{17}$ |
| Example 59 | A32/B14 | $1.1 \times 10^{18}$ | $6.4 \times 10^{16}$ |
| Comparative Example 20 | B13/B14 | $6.7 \times 10^{17}$ | $2.4 \times 10^{16}$ |

TABLE 17

| | Crosslinked<br>specimen | Volume resistance<br>(room temperature)<br>($\Omega$cm) | Volume resistance<br>(90° C.)<br>($\Omega$cm) |
| --- | --- | --- | --- |
| Example 59 | Example 55 | $3.7 \times 10^{18}$ | $6.0 \times 10^{17}$ |
| Comparative Example 21 | Comparative Example 19 | $6.2 \times 10^{17}$ | $1.1 \times 10^{15}$ |

As mentioned above, the present invention can provide a novel ethylene-a-olefin copolymer which has a relatively wide composition distribution and a low content of low molecular components and amorphous components to exhibit excellent thermal and chemical stability and electrical properties in spite of its narrow molecular weight distribution.

The copolymer of the present invention and the resin composition comprising the copolymer of the present invention exhibit excellent moldability or economical efficiency owing the superior properties of the copolymer of the present invention.

The film according to the present invention exhibits a high impact strength and is little apt to elution of resin components. It is also excellent in transparency, blocking resistance and low temperature heat-seal properties. A heat seal layer made of the film of the present invention retains the foregoing excellent properties, and its adhesiveness to the laminating base film shows no drop. The film of the present invention exhibits well-balanced blocking resistance and lubricating property and excellent low temperature heat-seal properties and allows the high speed formation of bag. It is thus suitable for the provision of a laminated product having gas barrier properties.

Electrical insulating materials comprising the copolymer of the present invention have a large volume resistance and a small temperature dependence of volume resistance. The electrical insulating materials are excellent in flexibility and moldability which maintain the foregoing excellent electrical properties after crosslinked. Thus, the electrical insulating materials is suitably used as electrical insulators. When used as an insulating layer for power cable, power loss during the transmission of high voltage power can be reduced without increasing the thickness of the insulating layer.

While the invention has been described in detail and with reference to specific embodiments thereof, it will be apparent to one skilled in the art that various changes and modifications can be made therein without departing from the spirit and scope thereof.

What is claimed is:

1. An ethylene-α-olefin copolymer having:

(A) a density d of 0.86 to 0.96 g/cm$^3$;

(B) a melt flow rate MFR of 0.01 to 200 g/10 min;

(C) a molecular weight distribution Mw/Mn of 1.5 to 4.5;

(D) a composition distribution parameter Cb of 1.08 to 2.00;

(E) an orthodichlorobenzene-soluble content X (wt %) at 25° C., a density d (g/cm$^3$) and a melt flow rate MFR (g/10 min) satisfying that:

(i) when the density (d) and the melt flow rate MFR satisfy relationship (I):

$$d - 0.008 \times \log MFR \geq 0.93 \quad (I)$$

the orthodichlorobenzene-soluble content X satisfies relationship (II):

$$X < 2.0 \quad (II)$$

(ii) when the density d and the melt flow rate MFR satisfy relationship (III):

$$d - 0.008 \times \log MFR < 0.93 \quad (III)$$

the orthodichlorobenzene-soluble content X satisfies relationship (IV):

$$X < 9.8 \times 10^3 \times (0.9300 - d + 0.008 \times \log MFR)^2 + 2.0 \quad (IV);$$

and (F) a number of peaks on an elution temperature-eluted amount curve determined by continuous temperature rising elution fractionation method TREF is 2 or more.

2. An ethylene-α-olefin copolymer as claimed in claim 1, wherein said molecular weight distribution Mw/Mn is from 1.8 to 3.5 and said composition distribution parameter Cb is from 1.10 to 2.00.

3. An ethylene-α-olefin copolymer as claimed in claim 1, wherein said copolymer has (G) an electrical activation energy of not more than 0.4 eV.

4. An ethylene-α-olefin copolymer as claimed in claim 2, wherein (H) said copolymer is obtained by copolymerization of ethylene and α-olefin in the presence of a catalyst;

(i) wherein the catalyst is obtained by (a) contacting components (1) to (4) with each other:

(1) a compound represented by $Me^1R^1_p R^2_q (OR^3)_r X^1_{4-p-q-r}$, where $R^1$ and $R^3$ each independently represent a $C_{1-24}$ hydrocarbon group or trialkylsilyl group; $R^2$ represents a 2,4-pentanedionate ligand, a dibenzoylmethanate ligand, a benzoylacetonate ligand; $X^1$ represents a halogen atom; $Me^1$ represents Zr, Ti or Hf; and p, q and r each represents an integer satisfying the relationships $0 \leq p \leq 4$, $0 \leq q \leq 4$, $0 \leq r \leq 4$, and $0 \leq (p+q+r) \leq 4$;

(2) a compound represented by $Me^2 R^4_m (OR^5)_n X^2_{z-m-n}$, where $Me^2$ represents a Group I, II, or III element, $R^4$ and $R^5$ each independently represent a $C_{1-24}$ hydrocarbon group; $X^2$ represents a hydrogen atom or a halogen atom, provided that when $X^2$ represents a hydrogen atom, $Me^2$ represents a Group III element; z represents the valence of $Me^2$; and m and n each represents an integer satisfying the relationships $0 \leq m \leq z$, $0 \leq n \leq z$, and $0 \leq (m+n) \leq z$;

(3) an organic cyclic compound having two or more conjugated double bonds; and (4) at least one compound selected from the group consisting of (a) a modified organic aluminum oxy compound having an Al—O—Al bond and (b) a boron compound; or (b) contacting components (1) to (4) with each other to form a resulting product, and supporting the resulting product on (5) at least one of an inorganic carrier and a particulated polymer carrier; and (ii) the molar ratio of component (4) to component (1) is 112 or less.

5. An ethylene-α-olefin copolymer as claimed in claim 3, wherein (H) said copolymer is obtained by copolymerization of ethylene and α-olefin in the presence of a catalyst;

(i) wherein the catalyst is obtained by (a) contacting components (1) to (4) with each other:
(1) a compound represented by $Me^1R^1_p R^2_q (OR^3)_r X^1_{4-p-q-r}$, where $R^1$ and $R^3$ each independently represent a $C_{1-24}$ hydrocarbon group or trialkylsilyl group; $R^2$ represents a 2,4-pentanedionate ligand, a dibenzoylmethanate ligand, a benzoylacetonate ligand; $X^1$ represents a halogen atom; $Me^1$ represents Zr, Ti or Hf; and p, q and r each represents an integer satisfying the relationships $0 \leq p \leq 4$, $0 \leq q \leq 4$, $0 \leq r \leq 4$, and $0 \leq (p+q+r) \leq 4$;

(2) a compound represented by $Me^2R^4_m (OR^3)_n X^2_{z-m-n}$, where $Me^2$ represents a Group I, II, or III element;

$R^4$ and $R^3$ each independently represent a $C_{1-24}$ hydrocarbon group; $X^2$ represents a hydrogen atom or a halogen atom, provided that when $X^2$ represents a hydrogen atom, $Me^2$ represents a Group III element, z represents the valence of $Me^2$; and m and n each represents an integer satisfying the relationships $0 \leq m \leq z$, $0 \leq n \leq z$, and $0 \leq (m+n) \leq z$;

(3) an organic cyclic compound having two or more conjugated double bonds; and (4) at least one compound selected from the group consisting of (a) a modified organic aluminum oxy compound having an Al—O—Al bond and (b) a boron compound; or (b) contacting components (1) to (4) with each other to form a resulting product, and supporting the resulting product on (5) at least one of an inorganic carrier and a particulated polymer carrier; and (ii) the molar ratio of component (4) to component (1) is 112 or less.

6. A film comprising an ethylene-α-olefin copolymer as claimed in claim 1.

7. A film comprising an ethylene-α-olefin copolymer as claimed in claim 4.

8. An electrical insulating material comprising an ethylene-α-olefin copolymer as claimed in claim 3.

9. A power cable comprising a conductor having thereon an electrical insulating layer comprising an insulating material as claimed in claim 8.

10. An electrical insulating material comprising an ethylene-α-olefin copolymer as claimed in claim 5.

11. A power cable comprising a conductor having thereon an electrical insulating layer comprising an insulating material as claimed in claim 10.

* * * * *